(12) United States Patent
Tsai et al.

(10) Patent No.: US 10,039,104 B2
(45) Date of Patent: Jul. 31, 2018

(54) DYNAMIC BEAMFORMING METHOD AND RELATED APPARATUSES USING THE SAME

(71) Applicant: Industrial Technology Research Institute, Hsinchu (TW)

(72) Inventors: Tsung-Hua Tsai, Kaohsiung (TW); Chin-Kuo Jao, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/235,108

(22) Filed: Aug. 12, 2016

(65) Prior Publication Data
US 2017/0048863 A1 Feb. 16, 2017

Related U.S. Application Data

(60) Provisional application No. 62/205,001, filed on Aug. 14, 2015.

(51) Int. Cl.
*H04L 5/00* (2006.01)
*H04B 7/06* (2006.01)
(Continued)

(52) U.S. Cl.
CPC ...... *H04W 72/0453* (2013.01); *H04B 7/0456* (2013.01); *H04B 7/0478* (2013.01);
(Continued)

(58) Field of Classification Search
CPC .. H04B 7/0478; H04B 7/0617; H04B 7/0626; H04B 7/0639; H04B 7/0456;
(Continued)

(56) References Cited

U.S. PATENT DOCUMENTS

| 8,767,681 B2 | 7/2014 | Hammarwall et al. |
| 8,811,524 B2 | 8/2014 | Hammarwall et al. |

(Continued)

FOREIGN PATENT DOCUMENTS

| CN | 103152140 | 6/2013 |
| CN | 105191165 | 12/2015 |

(Continued)

OTHER PUBLICATIONS

Huawei et al., "Codebook enhancements for EBF/FD-MIMO, " GPP TSG RAN WG1 Meeting #80, R1-150057, Feb. 9-13, 2015, pp. 1-4.
(Continued)

*Primary Examiner* — George Eng
*Assistant Examiner* — Umair Ahsan
(74) *Attorney, Agent, or Firm* — JCIPRNET

(57) ABSTRACT

The disclosure proposes a dynamic beamforming method and related apparatuses using the same method. According one of the exemplary embodiments, the proposed dynamic beamforming method is applicable to a base station and includes not limited to transmitting a first reference signal; transmitting a first configuration message comprising a first oversampling rate of a first dimension and a first oversampling rate of a second dimension; receiving a first information feedback of the first reference signal based on the first oversampling rate of the first dimension and the first oversampling rate of the second dimension in response to transmitting the first configuration message; and transmitting a second configuration message comprising a second oversampling rate of the first dimension and a second oversampling rate of the second dimension after receiving the first information feedback of the first reference signal.

11 Claims, 21 Drawing Sheets

(51) Int. Cl.
*H04W 72/04* (2009.01)
*H04W 76/27* (2018.01)
*H04B 7/0456* (2017.01)

(52) U.S. Cl.
CPC ......... *H04B 7/0482* (2013.01); *H04B 7/0617* (2013.01); *H04B 7/0626* (2013.01); *H04B 7/0639* (2013.01); *H04B 7/0695* (2013.01); *H04L 5/005* (2013.01); *H04W 76/27* (2018.02); *H04B 7/065* (2013.01)

(58) Field of Classification Search
CPC .. H04B 7/0482; H04B 7/0619; H04B 7/0695; H04L 5/0048; H04L 5/005; H04W 72/0453
See application file for complete search history.

(56) References Cited

U.S. PATENT DOCUMENTS

| | | |
|---|---|---|
| 8,897,254 B2 | 11/2014 | Koivisto et al. |
| 9,094,075 B2 | 7/2015 | Liu et al. |
| 9,281,881 B2 | 3/2016 | Onggosanusi et al. |
| 9,407,345 B2 | 8/2016 | Kim et al. |
| 2013/0308715 A1* | 11/2013 | Nam ................. H04B 7/0469 375/267 |
| 2014/0113669 A1 | 4/2014 | Kuo |
| 2015/0030092 A1 | 1/2015 | Krishnamurthy |
| 2015/0280801 A1 | 10/2015 | Xin et al. |
| 2016/0323022 A1* | 11/2016 | Rahman ............. H04B 7/0469 |
| 2017/0078065 A1* | 3/2017 | Nam ................. H04L 5/0048 |
| 2017/0250743 A1* | 8/2017 | Jongren ............. H04B 7/0469 |

FOREIGN PATENT DOCUMENTS

| | | |
|---|---|---|
| CN | 105432024 | 3/2016 |
| EP | 2645616 | 10/2013 |
| WO | 2012097469 | 7/2012 |
| WO | 2014113992 | 7/2014 |
| WO | 2014158206 | 10/2014 |
| WO | 2014198037 | 12/2014 |

OTHER PUBLICATIONS

Huawei et al., "Codebook enhancements for EBF/FD-MIMO," 3GPP TSG RAN WG1 Meeting #80bis, R1-151285, Apr. 20-24, 2015, pp. 1-4.
3GPP, "Technical Specification Group Radio Access Network; Study on elevation beamforming / Full-Dimension (FD) Multiple Input Multiple Output (MIMO) for LTE," 3GPP TR 36.897 V13.0.0, Jun. 2015, pp. 1-58.
Shuang et al., "Design and Evaluation of LTE-Advanced Double Codebook," IEEE 73rd Vehicular Technology Conference (VTC Spring), May 15-18, 2011, pp. 1-5.
Wu et al., "Codebook Design for LTE-A Downlink System," IEEE Vehicular Technology Conference (VTC Fall), Sep. 5-8, 2011, pp. 1-5.
Wu et al., "Codebook Design for Cross-Polarized Linear Antenna Array in LTE-A Downlink System," IEEE Vehicular Technology Conference (VTC Fall), Sep. 5-8, 2011, pp. 1-5.2011.
Catt, "Configurable codebook design for FD MIMO, " 3GPP TSG RAN WG1 Meeting #81, R1-152594, May 25-29, 2015, pp. 1-4.
Catt, "Configurable codebook design for FD MIMO," 3GPP TSG RAN WG1 Meeting #80bis, R1-151368, Apr. 20-24, 2015, pp. 1-4.
Samsung, "Specification impacts and evaluation results with linear-combination codebook enhancements," 3GPP TSG RAN WG1 Meeting #81, R1-152891, May 25-29, 2015, pp. 1-3.
Samsung, "CSI feedback and PMI codebook enhancement related to unprecoded CSI-RS," 3GPP TSG RAN WG1 Meeting #80bis, R1-152163, Apr. 20-24, 2015, pp. 1-6.
Samsung, "Specification impacts and evaluation results with KP codebook enhancements," 3GPP TSG RAN WG1 Meeting #81, R1-152890, May 25-29, 2015, pp. 1-3.
Catt, "Codebook structure for FD-MIMO," 3GPP TSG RAN WG1 Meeting #82, R1-153939, Aug. 24-28, 2015, pp. 1-6.
Huawei et al., "Codebook for up to 16 ports 2D antenna arrays," 3GPP TSG RAN WG1 Meeting #82, R1-153796, Aug. 24-28, 2015, pp. 1-8.
Huawei, "Further discussion on the adaptive codebook," 3GPP TSG RAN WG1 meeting #60, R1-101063, Feb. 22-26, 2010, pp. 1-3.
Huawei, "Adaptive codebook designs and simulation results," 3GPP TSG RAN WG1#59bis, R1-100797, Jan. 18-22, 2010, pp. 1-6.
Huawei, "Adaptive Codebook Designs for MU-MIMO," 3GPP TSG RAN WG1 meeting #56bis, R1-091282, Mar. 23-27, 2009, pp. 1-8.
Huawei, "Feedback of Long Term Channel Information for Adaptive Codebook," 3GPP TSG RAN WG1#60, R1-101062, Feb. 22-26, 2010, pp. 1-5.
Huawei, "Adaptive Codebook Designs for DL MU-MIMO," 3GPP TSG RAN WG1 meeting #57bis, R1-092389, Jun. 29-Jul. 3, 2009, pp. 1-10.
Fujitsu, "UL-MIMO Enhancement with Codebook Size Adaptation and Nested Codebook Group," 3GPP TSG-RAN1 #59b, R1-100582, Jan. 18-22, 2010, pp. 1-9.
"Office Action of Taiwan Counterpart Application," dated Apr. 24, 2017, p. 1-p. 4.
"Search Report of European Counterpart Application," dated Mar. 1, 2017, p. 1-p. 16.

\* cited by examiner

Table 7.2.4-0A: Codebook for 1-layer CSI reporting using antenna ports 0 to 3 or 15 to 18

| $i_1$ | $i_2$ | | | | | | | |
|---|---|---|---|---|---|---|---|---|
| | 0 | 1 | 2 | 3 | 4 | 5 | 6 | 7 |
| 0 – 15 | $W^{(1)}_{i_1,0}$ | $W^{(1)}_{i_1,8}$ | $W^{(1)}_{i_1,16}$ | $W^{(1)}_{i_1,24}$ | $W^{(1)}_{i_1+8,2}$ | $W^{(1)}_{i_1+8,10}$ | $W^{(1)}_{i_1+8,18}$ | $W^{(1)}_{i_1+8,26}$ |
| $i_1$ | $i_2$ | | | | | | | |
| | 8 | 9 | 10 | 11 | 12 | 13 | 14 | 15 |
| 0 – 15 | $W^{(1)}_{i_1+16,4}$ | $W^{(1)}_{i_1+16,12}$ | $W^{(1)}_{i_1+16,20}$ | $W^{(1)}_{i_1+16,28}$ | $W^{(1)}_{i_1+24,6}$ | $W^{(1)}_{i_1+24,14}$ | $W^{(1)}_{i_1+24,22}$ | $W^{(1)}_{i_1+24,30}$ | where $W^{(1)}_{m,n} = \dfrac{1}{2}\begin{bmatrix} v'_m \\ \varphi'_n v'_m \end{bmatrix}$

| Value of Codebook-Config | $i_{1,1}$ | $i_{1,2}$ | $i_2$ | | | |
|---|---|---|---|---|---|---|
| | | | 0 | 1 | 2 | 3 |
| 2 | $0,1,\ldots,\dfrac{N_1O_1}{2}-1$ | $0,1,\ldots,\dfrac{N_2O_2}{2}-1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |
| Value of Codebook-Config | $i_{1,1}$ | $i_{1,2}$ | $i_2$ | | | |
| | | | 4 | 5 | 6 | 7 |
| 2 | $0,1,\ldots,\dfrac{N_1O_1}{2}-1$ | $0,1,\ldots,\dfrac{N_2O_2}{2}-1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |

202

CSI-RS-ConfigEMIMO field descriptions codebookConfig
Indicates a sub-set of the codebook entry, see TS 36.213 [23].

codebookConfigNx
Indicates the number of antenna ports per polarization in dimension x as used for transmission of CSI reference signals. Value n1 corresponds to 1, n2 to 2 and so on, see TS 36.213 [23].

codebookOverSamplingRateConfig-Ox
Indicates the spatial over-sampling rate in dimension x as used for transmission of CSI reference signals. Value n1 corresponds to 1, n2 to 2 and so on, see TS 36.213 [23].

```
codebookConfigN1-r13                    203    ENUMERATED {n1, n2, n3, n4, n8},
codebookConfigN2-r13                           ENUMERATED {n1, n2, n3, n4, n8},
codebookOverSamplingRateConfig-O1-r13          ENUMERATED {n4, n8}
codebookOverSamplingRateConfig-O2-r13          ENUMERATED {n4, n8}
codebookConfig-r13                             INTEGER (1..4),
```

FIG.2

$$W_1 = \begin{bmatrix} \overbrace{\phantom{XXXXX}}^{301} & & \\ & & 0 & 0 \\ 0 & 0 & & \end{bmatrix}$$

FIG.3

$$W_1 W_2 = \begin{bmatrix} w_1 & w'_1 & & \\ w_2 & w'_2 & 0 & 0 \\ w_3 & w'_3 & & \\ w_4 & w'_4 & & \\ & & w_1 & w'_1 \\ 0 & 0 & w_2 & w'_2 \\ & & w_3 & w'_3 \\ & & w_4 & w'_4 \end{bmatrix} \begin{bmatrix} 0 \\ 1 \\ \varphi^p 0 \\ \varphi^p 1 \end{bmatrix} = \begin{bmatrix} w'_1 \\ w'_2 \\ w'_3 \\ w'_4 \\ \varphi^p w'_1 \\ \varphi^p w'_2 \\ \varphi^p w'_3 \\ \varphi^p w'_4 \end{bmatrix}$$

Select 2nd beam 401

FIG.4

| Codebook-Config | Beam group | $(L_1, L_2)$ | $(s_1, s_2)$ | $(p_1, p_2)$ |
|---|---|---|---|---|
| 1 |  | (1,1) | (1,1) | (1,1) |
| 2 |  | (2,2) | (2,2) | (1,1) |
| 3 |  | (2,2) | (2,2) | (1,1) |
| 4 |  | (4,1) | (2,2) | (1,1) |

Table 7.2.4-9: Supported configurations of $(O_1, O_2)$ and $(N_1, N_2)$

| Number of CSI-RS antenna ports, $P$ | $(N_1, N_2)$ | $(O_1, O_2)$ |
|---|---|---|
| 8 | (2,2) | (4,4), (8,8) |
| 12 | (2,3) | (8,4), (8,8) |
| | (3,2) | (8,4), (4,4) |
| 16 | (2,4) | (8,4), (8,8) |
| | (4,2) | (8,4), (4,4) |
| | (8,1) | (4,-), (8,-) |

From TS36.331

```
codebookConfigN1-r13              ENUMERATED  {an1, an2, an3, an4, an8},
codebookConfigN2-r13              ENUMERATED  {an1, an2, an3, an4, an8},
codebookOverSamplingRateConfig-O1-r13  ENUMERATED  {na, an4, an8},
codebookOverSamplingRateConfig-O2-r13  ENUMERATED  {na, an4, an8},
codebookConfig-r13                ENUMERATED  {an1, an2, an3, an4},
```

FIG.10

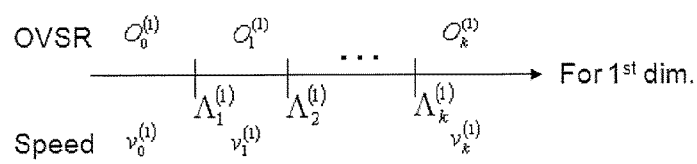
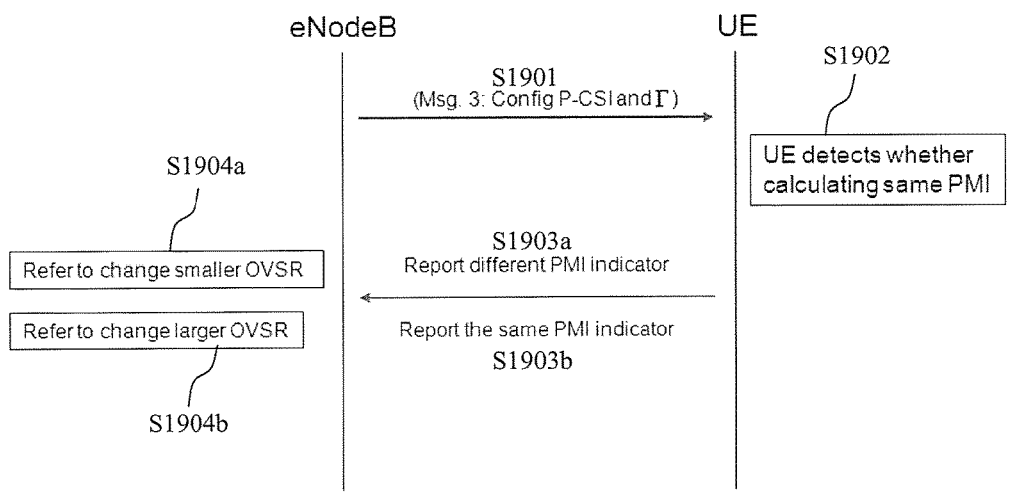
FIG.18
FIG.19

| Value of Codebook-Config | $i_{1,1}$ | $i_{1,2}$ | $i_2$ | | | |
|---|---|---|---|---|---|---|
| | | | 0 | 1 | 2 | 3 |
| 2 | $0,1,\ldots,\frac{N_1O_1}{2}-1$ | $0,1,\ldots,\frac{N_2O_2}{2}-1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |
| Value of Codebook-Config | $i_{1,1}$ | $i_{1,2}$ | | | | |
| | | | 4 | 5 | 6 | 7 |
| 2 | $0,1,\ldots,\frac{N_1O_1}{2}-1$ | $0,1,\ldots,\frac{N_2O_2}{2}-1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |
| Value of Codebook-Config | $i_{1,1}$ | $i_{1,2}$ | | | | |
| | | | 8 | 9 | 10 | 11 |
| 2 | $0,1,\ldots,\frac{N_1O_1}{2}-1$ | $0,1,\ldots,\frac{N_2O_2}{2}-1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |
| Value of Codebook-Config | $i_{1,1}$ | $i_{1,2}$ | | | | |
| | | | 12 | 13 | 14 | 15 |
| 2 | $0,1,\ldots,\frac{N_1O_1}{2}-1$ | $0,1,\ldots,\frac{N_2O_2}{2}-1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ | where $W^{(1)}_{l,m,n,k} = \frac{1}{\sqrt{P}}\begin{bmatrix} v_{l,m} \\ \varphi_n v_{l,m} \end{bmatrix}$

FIG.24

DYNAMIC BEAMFORMING METHOD AND RELATED APPARATUSES USING THE SAME

CROSS REFERENCE TO RELATED APPLICATION

This application claims the priority benefit of U.S. provisional application Ser. No. 62/205,001, filed on Aug. 14, 2015. The entirety of the above-mentioned patent application is hereby incorporated by reference herein and made a part of specification.

TECHNICAL FIELD

The disclosure is directed to a dynamic beamforming method and related apparatuses using the same method.

BACKGROUND

For the purpose of increasing the directivities of signals of a MIMO communication system, the one dimensional precoder codebook has been upgraded into a two dimensional precoder codebook. An Evolved NodeB (eNB) may group a plurality of radio frequency (RF) beams into a beam group. The two dimensional codebook would increase the directivity of a RF beam of a beam group so as to increase the signal to interference plus noise ratio (SINR) of a user equipment (UE) under the coverage of the RF beam. However, the increase directivity of the RF beam would mean that the UE could slip through the coverage of RF beams and thus the resolution of the beam coverage would need to be increased. The resolution of a beam coverage could be increased or decreased by adjusting an oversampling rate of a beamforming weight. However, the increased oversampling rate could be mean that the signaling overhead required to select a precoder matrix would be increased. The oversampling rate would also affect the search space of a UE receiving. Specific details are elucidate in FIG. 1~FIG. 7.

FIG. 1 illustrates a codebook for single layer CSI reporting by using antenna ports 0 to 3 or 15 to 18 as specified by 3GPP technical specification (TS) 36.213 which is incorporated by reference to define the concepts and definitions of the disclosure. The codebook is an example of a typical one dimensional codebook. As the codebook was modified to accommodate for multi-dimensional transmissions, the codebook has not only become more complex but also the overhead of precoder matrix indicator (PMI) has also been increased. A precoder from the codebook could be used by selecting a PMI.

FIG. 2 illustrates a two dimensional codebook as specified by 3GPP LTE release 13. For the disclosure, one of the parameters that could be of interests is $N_{(x)}O_{(x)}$ 201 where $N_{(x)}$ represents codebookConfigN1 202 which indicates the number of antenna ports per polarization in dimension x as used for transmission of CSI reference signals. The format of codebookConfigN1 is stated on the bottom of FIG. 2 where the value n1 corresponds to 1 antenna port, n2 to 2 antenna ports and so on. Also $O_{(x)}$, represents codebookOverSamplingRateConfig-Ox 203 which indicates the spatial over-sampling rate in dimension x as used for transmission of CSI-reference signals, where the value n4 corresponds to 4 over-sampling rate, n8 corresponds to 8 over-sampling rate and so on. This codebookOverSamplingRateConfig-Ox is synonymous with "oversampling rate" in this disclosure. Further details with regard to the functionalities related to the oversampling rate are described in TS 36.213 and TS 36.331 which is incorporated by reference to define the concepts and definitions of the disclosure.

The two dimensional codebook as specified by 3GPP LTE release 13 for example has a dual-codebook structure. The precoding matrix in the two dimensional codebook is represented as $W=W_1W_2$ where the precoding matrix $W_1$ is a long-term precoding matrix which is based on the long-term statistical properties of the channel and could be utilized by referred to a long-term precoding matrix indicator (PMI) and $W_2$ is a short-term codebook which contains a short-term precoding matrix which could be utilized by referred to a short term PMI. The long-term precoding matrix $$W1 = \begin{pmatrix} X_1 \otimes X_2 & 0 \\ 0 & X_1 \otimes X_2 \end{pmatrix}_{2N_1N_2 \times 2L_1L_2}$$

where $X_1 \otimes X_2$ is the Kronecker Product (KP) operation. $X_1$ is an $N_1 \times L_1$ matrix with $L_1$ column vectors being a $O_1 \times$ oversampled DFT vector of length $N_1$:

$$v_1 = \left[ 1 \; e^{\frac{j2\pi l}{N_1 O_1}} \; \ldots \; e^{\frac{j2\pi(N_1-1)l}{N_1 O_1}} \right]^t.$$

$X_2$ is an $N_2 \times L_2$ matrix with $L_2$ column vectors being a $O_2 \times$ oversampled DFT vector of length $N_2$:

$$v_2 = \left[ 1 \; e^{\frac{j2\pi l}{N_2 O_2}} \; \ldots \; e^{\frac{j2\pi(N_2-1)l}{N_2 O_2}} \right]^t.$$

$N_1$ and $N_2$ are the number of antenna ports per polarization in $1^{st}$ and $2^{nd}$ dimension. For example, as shown in FIG. 3, one beam group 301 would contain 2 beams ($L_1L_2=2$). In addition, since an antenna setup thus creates quite pronounced channel properties, which are matched to a block diagonal structure of $W_1$.

Short-term precoding matrix $W_2$ is design for beam selection as well as co-phasing between the beams selected for two polarizations. More specifically, the short-term codebook $W_2$ is designed with dynamic column selection for different antenna polarization and co-phasing $\varphi^p$ among selected beams. $W_2$ can be represented as Rank 1:

$$W2 = \frac{1}{\sqrt{N_1N_2}} \begin{bmatrix} e^n \\ \varphi^p e^n \end{bmatrix},$$

where the co-phasing term is $$\varphi^p = e^{\frac{j2\pi p}{4}}$$

as $e^n$ denotes beam selection vector which is the n column of identity matrix $I_{N1N2}$. An example selecting the $2^{nd}$ beam 401 of a precoding matrix $W_1W_2$ is shown in FIG. 4.

An example of beam directions and related parameters is shown in FIG. 5. For FIG. 5, it is assumed that there are $N_dO_d$ beams in the $d^{th}$ dimension. Referring to FIG. 6 which shows a two dimensional grid of beam map. In case of $N_1=2$, for a first instance, for the first case 504 of $O_1=2$, there could be a total of 4 beams. For a second instance, for the second case 505 of $O_1=4$, there could be a total of 8 beams.

The parameters that are shown in FIG. 6 are defined as the following. The parameter $i_{1d}$ is first PMI or long term beam group index $$\left(\text{e.g.,}\ i_{11} = 0\ ...\ \frac{N_1 O_1}{S_1} - 1;\ i_{12} = 0\ ...\ \frac{N_2 O_2}{S_2} - 1\right).$$

For instance, the beam group index $i_{11}$ indicates a beam group index in the $1^{st}$ dimension (e.g. a first dimensional first PMI) and beam group index $i_{12}$ indicates a beam group index in the $2^{nd}$ dimension (e.g. a second dimensional first PMI). To put it plainly, the indices $i_{11}$ and $i_{12}$ determine a beam group which could be phrased as a long term PMI (e.g. first PMI). The index $i_2$ selects a beam within the beam group which could be phrased as a short term PMI (e.g. second PMI). The parameter $P_d$ is intra group beam spacing. The parameter $s_d$ is leading beam space between two adjacent groups or beam group spacing. The parameter $N_d$ is numbers of port/TXRU per polarization. The parameter $O_d$ is oversampling rates, and the parameter $L_d$ is number of beams in each beam group. The parameter $L'_d$ is beam group layout (e.g. $L'_1=4;\ L'_2=2$). The codebook configurations and their corresponding beam group parameters of the codebooks is shown in FIG. 7

As previously described, the legacy codebook design with fixed oversampling rate may not provide sufficient resolution to provide a full coverage since the larger antenna ports may implicate smaller beam coverage caused by highly directive antenna beams. However, an increased oversampling rate may implicate greater burden for CSI reporting because of the increased codebook size. The inefficient use of oversampling rate may also adversely impact the computational efficiency. Therefore, a dynamic beamforming method and related apparatuses that use the same method could enhance the above stated shortcomings.

SUMMARY OF THE DISCLOSURE

Accordingly, the disclosure is directed to a dynamic beamforming method and related apparatuses using the same method.

In one of the exemplary embodiments, the disclosure is directed to a dynamic beamforming method applicable to a base station. The method would include not limited to transmitting a first reference signal; transmitting a first configuration message comprising a first oversampling rate of a first dimension and a first oversampling rate of a second dimension; receiving a first information feedback of the first reference signal based on the first oversampling rate of the first dimension and the first oversampling rate of the second dimension in response to transmitting the first configuration message; and transmitting a second configuration message comprising a second oversampling rate of the first dimension and a second oversampling rate of the second dimension after receiving the first information feedback of the first reference signal.

In one of the exemplary embodiment, the disclosure is directed to a base station which includes not limited to a transmitter; a receiver; and a processor coupled to the transmitter and the receiver. The processor is configured at least for: transmitting, via the transmitter, a first reference signal; transmitting, via the transmitter, a first configuration message comprising a first oversampling rate of a first dimension and a first oversampling rate of a second dimension; receiving, via the receiver, a first information feedback of the first reference signal based on the first oversampling rate of the first dimension and the first oversampling rate of the second dimension in response to transmitting the first configuration message; and transmitting, via the transmitter, a second configuration message comprising a second oversampling rate of the first dimension and a second oversampling rate of the second dimension after receiving the first information feedback.

In one of the exemplary embodiments, the disclosure is directed to a dynamic beamforming method applicable to a user equipment. The method would include not limited to receiving a first configuration message which comprises a set of oversampling rates comprising a first oversampling rate of a first dimension, a first oversampling rate of a second dimension, a second oversampling rate of a first dimension, and a second oversampling rate of a second dimension; selecting the first oversampling rate of the first dimension and the first oversampling rate of a second dimension; performing a first information measurement based on the first oversampling rate of the first dimension and the first oversampling rate of a second dimension; and transmitting a response message comprising the first oversampling rate of the first dimension, the first oversampling rate of a second dimension, and the first CSI measurement.

In one of the exemplary embodiments, the disclosure is directed to a user equipment which would include not limited to a transmitter, a receiver, and a processor coupled to the transmitter and the receiver. The processor is configured at least for receiving, via the receiver, a first configuration message which comprises a set of oversampling rates comprising a first oversampling rate of a first dimension, a first oversampling rate of a second dimension, a second oversampling rate of a first dimension, and a second oversampling rate of a second dimension; selecting the first oversampling rate of the first dimension and the first oversampling rate of a second dimension; performing a first information measurement based on the first oversampling rate of the first dimension and the first oversampling rate of a second dimension; and transmitting, via the transmitter, a response message comprising the first oversampling rate of the first dimension, the first oversampling rate of a second dimension, and the first information measurement.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates a codebook for single layer CSI reporting by using antenna ports 0 to 3 or 15 to 18 as specified by 3GPP technical specification (TS) 36.213.

FIG. 2 illustrates a two dimensional codebook as specified by 3GPP TS 36.213 and TS 36.331.

FIG. 3 illustrates an example of the long term precoding matrix $W_1$.

FIG. 4 illustrates an example selecting the $2^{nd}$ beam of a precoding matrix $W_1W_2$.

FIG. 10 illustrates the parameters used for the examples shown in FIG. 11 FIG. 15.

FIG. 18 illustrates determining oversampling rate based on speed calculations in accordance with one of the exemplary embodiments of the disclosure.

FIG. 19 illustrates CSI reporting under periodic CSI mode in accordance with one of the exemplary embodiments of the disclosure.

FIG. 24 illustrates forming beam group configuration two by combining multiple precoders according to TS36.213 Section 7.2.4.

DETAILED DESCRIPTION OF DISCLOSED EMBODIMENTS

Figure 5:
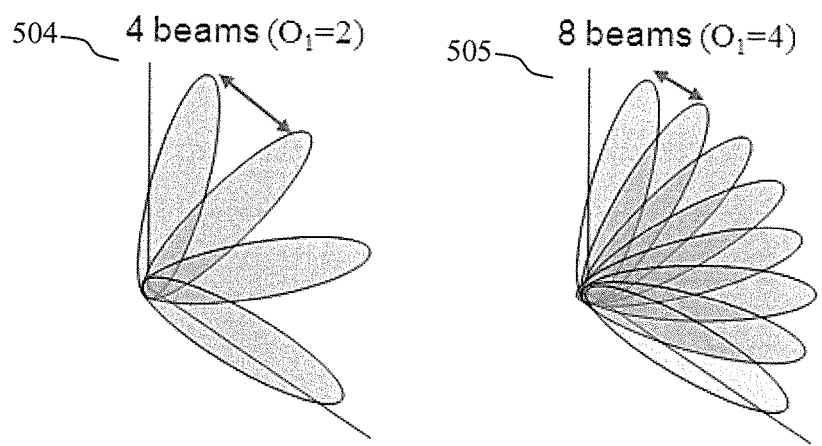
FIG. 5 illustrates examples of 4 beams and 8 beams in the case of two antenna ports in a certain dimension with various oversampling rates.
Figures 6, 7:
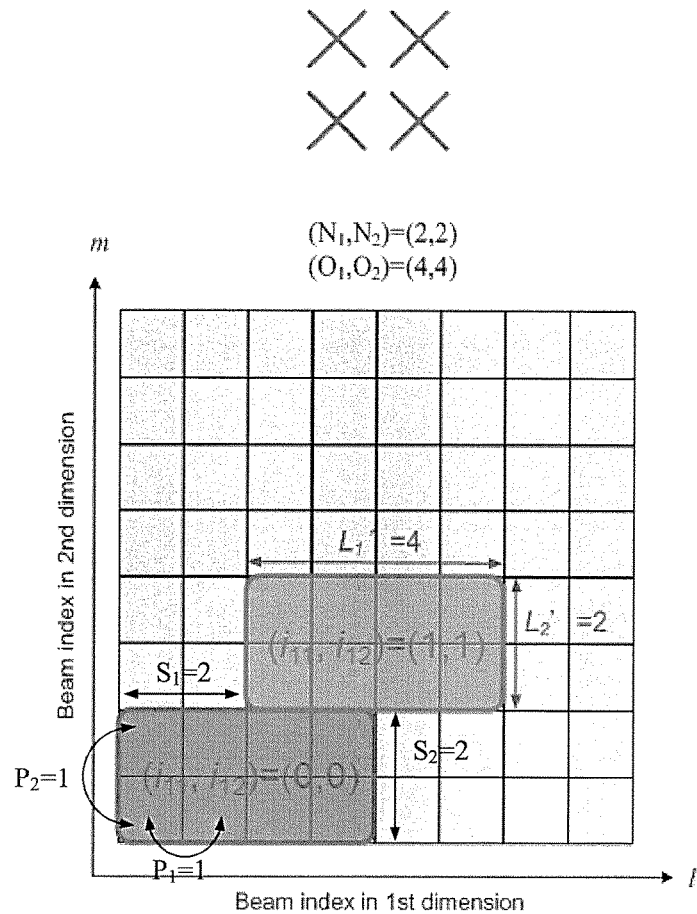
FIG. 6 illustrates an example of a grid of beam map in two dimensions.
FIG. 7 illustrates codebook configurations and their corresponding beam group parameters of codebooks.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 8A~FIG. 8E and their corresponding written descriptions serve to explain an overview of the disclosure. The disclosure proposes a dynamically adjustable oversampling rate to the codebook. The size of codebook may then be variable according to the dynamically adjustable oversampling rate. Even though a larger codebook size would be able to provide greater overall signal coverage since the resolution of discrete Fourier Transform (DFT)-based beams would be greater, a smaller codebook size nevertheless would result in less measurement feedback reporting overhead. Moreover, a codebook restriction method could not only be utilized to further reduce or keep constant the CSI feedback overhead size but to reduce the search space of a UE during a measurement report process and thus decrease the overall computational complexity.

Figure 8A:
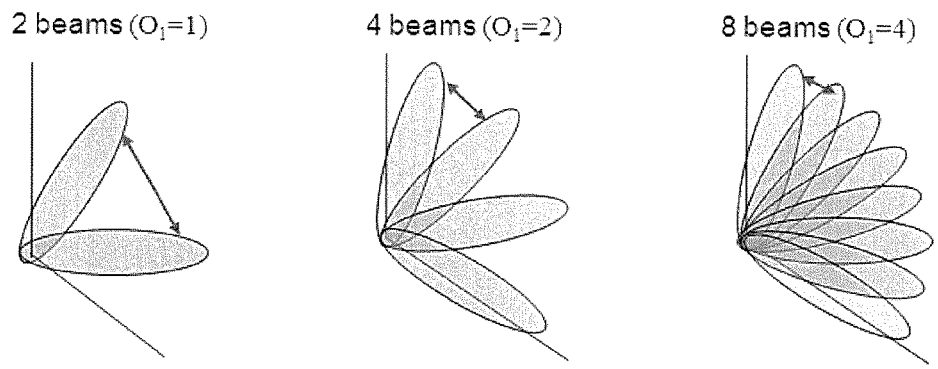
FIG. 8A illustrates an example of the relationship between the oversampling rate and the number of beams.

Based upon KP-based dual-stage codebook design as previously described, an eNB or a UE would be able to adjust the codebook size by adaptively changing the oversampling rate, or namely, the codebookOversSamplingRate-Config-Ox as previously described. In general, a larger oversampling rate would create a higher number of beams, while a smaller oversampling rate would create a lesser number of beams. As shown in FIG. 8A for which $N_1=2$, if $O_1=1$, then there would be 2 beams; if $O_1=2$, there would be 4 beams; and if $O_1=4$, there would be 8 beams. If there is a higher number of beams, the higher number of beams would result in higher beam-directional resolution and thus greater spatial coverage. The lower number of beams would reduce the overall feedback overhead as well as computational complexity. Therefore, the disclosure proposes a dynamic beamforming method and related apparatuses using the same method.

Figure 8B:
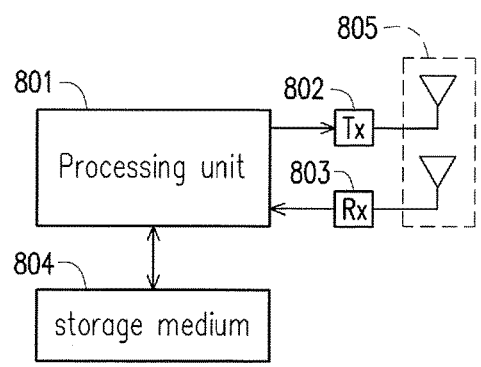
FIG. 8B illustrates the hardware diagram of a base station in terms of functional block diagrams in accordance with one of the exemplary embodiment of the disclosure.

FIG. 8B illustrates the hardware diagram of a base station in terms of functional block diagrams in accordance with one of the exemplary embodiment of the disclosure. The base station would include not limited to a processing unit 801 electrically coupled to a transmitter 802, a receiver 803, a non-transitory storage medium 804, and an antenna array 805. The antenna array 805 is electrically connected to the transmitter 802 and the receiver 803 and would include one or multiple physical antennas for transmitting and receiving radio frequency signals. The transmitter 802 contains circuits for transmitting wireless signal in a radio frequency spectrum, whereas the receiver 803 contains circuits for receiving wireless signals. The non-transitory storage medium 804 may contain volatile and nonvolatile memories to store temporarily or permanent information such as programming codes, codebooks, various temporary and permanent data, and so forth. The processing unit 801 contains one or more processors and processes digital signals to perform the proposed dynamic beamforming method described in FIG. 8E as well as subsequently described exemplary embodiments of the disclosure. The functions of the processing unit 801 could be implemented by using programmable units such as a micro-processor, a micro-controller, digital signal processor (DSP) chips, a field-programmable gate array (FPGA), etc. The functions of the processing unit 801 may also be implemented with separate electronic devices or ICs, and functions performed by the processing unit 801 may also be implemented within the domains of either hardware or software.

Figure 8C:
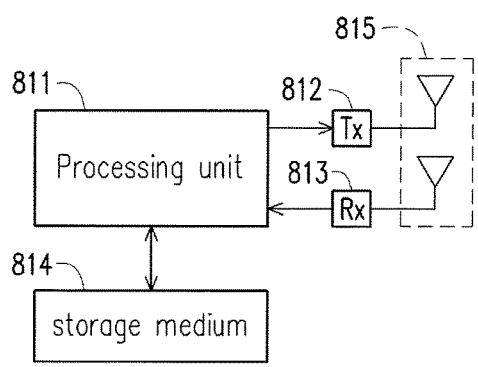
FIG. 8C illustrates the hardware diagram of a user equipment in terms of functional block diagrams in accordance with one of the exemplary embodiment of the disclosure.

FIG. 8C illustrates the hardware diagram of a user equipment in terms of functional block diagrams in accordance with one of the exemplary embodiment of the disclosure. The user equipment would include not limited to a processing unit 811 electrically coupled to a transmitter 812, a receiver 813, a non-transitory storage medium 814, and an antenna array 815. The antenna array 815 is electrically connected to the transmitter 812 and the receiver 813 and would include one or multiple physical antennas for transmitting and receiving radio frequency signals. The transmitter 812 contains circuits for transmitting wireless signals, and the receiver 813 contains circuits for receiving wireless signals. The non-transitory storage medium 814 may contain volatile and nonvolatile memories to store temporarily or permanent information such as programming codes, codebooks, various temporary and permanent data, and so forth. The processing unit 811 contains one or more processors and processes digital signal and to perform the proposed dynamic beamforming method described in FIG. 8E as well as subsequently described exemplary embodiments of the disclosure. The functions of the processing unit 811 could be implemented by using programmable units such as a micro-processor, a micro-controller, digital signal processor (DSP) chips, a field-programmable gate array (FPGA), etc. The functions of the processing unit 811 may also be implemented with separate electronic devices or ICs, and functions performed by the processing unit 811 may also be implemented within the domains of either hardware or software.

Figure 8D:
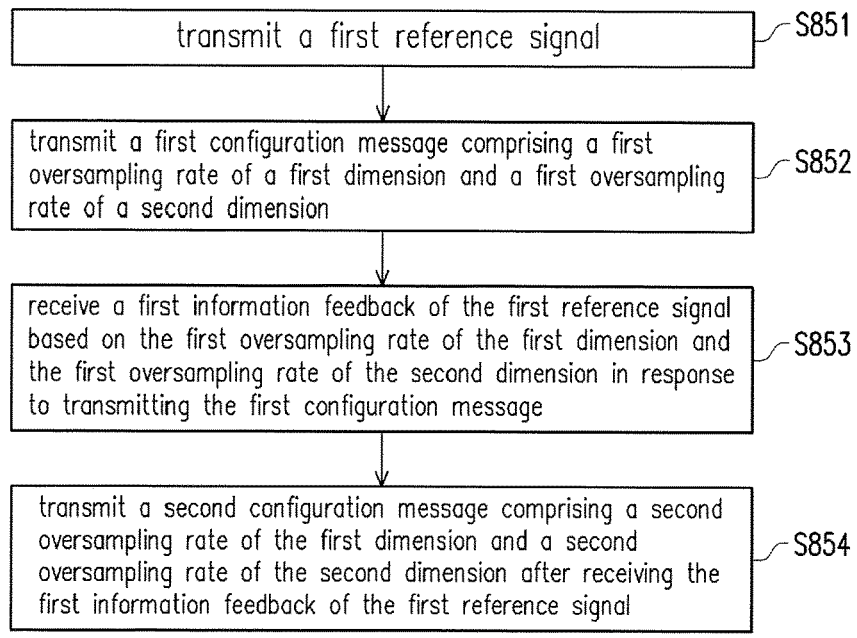
FIG. 8D illustrates a dynamic beamforming method applicable to a base station in accordance with one of the exemplary embodiment of the disclosure.

FIG. 8D illustrates a proposed dynamic beamforming method applicable to a base station in accordance with one of the exemplary embodiment of the disclosure. In step S851, the base station would transmit a first reference signal. The step S852, the base station would transmit a first configuration message comprising a first oversampling rate of a first dimension and a first oversampling rate of a second dimension. In step S853, the base station would receive a first information feedback of the first reference signal based on the first oversampling rate of the first dimension and the first oversampling rate of the second dimension in response to transmitting the first configuration message. In step S854, the base station would transmit a second configuration message comprising a second oversampling rate of the first dimension and a second oversampling rate of the second dimension after receiving the first information feedback of the first reference signal. The subsequent disclosure would describe the aforementioned steps in further details.

Figure 8E:
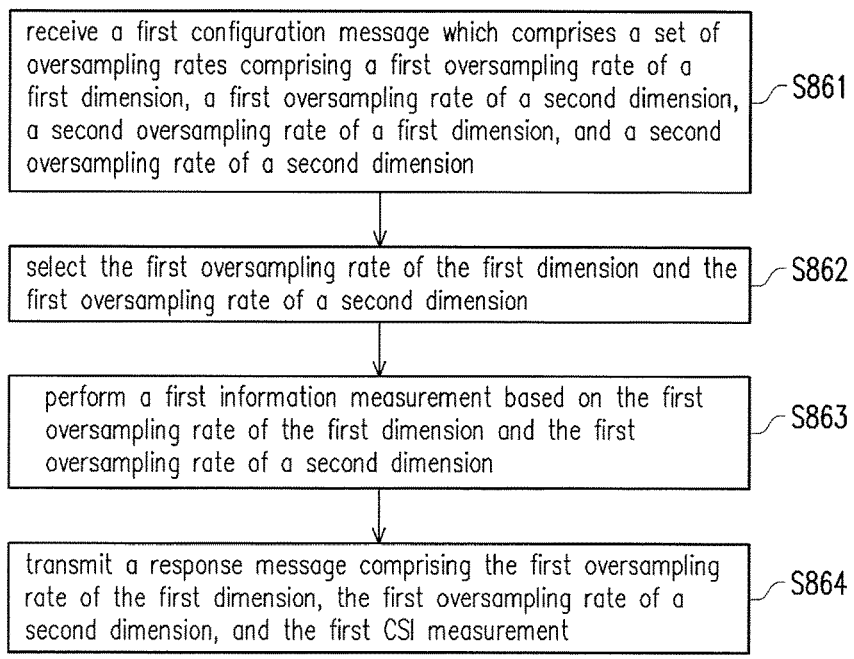
FIG. 8E illustrates a dynamic beamforming method applicable to a user equipment in accordance with one of the exemplary embodiment of the disclosure.

FIG. 8E illustrates a proposed dynamic beamforming method applicable to a user equipment in accordance with one of the exemplary embodiment of the disclosure. In step S861, the UE would receive a first configuration message which comprises a set of oversampling rates comprising a first oversampling rate of a first dimension, a first oversampling rate of a second dimension, a second oversampling rate of a first dimension, and a second oversampling rate of a second dimension. In step S862, the UE would select the first oversampling rate of the first dimension and the first oversampling rate of a second dimension. In step S863, the UE would perform a first information measurement based on the first oversampling rate of the first dimension and the first oversampling rate of a second dimension. In step S864, the UE would transmit a response message comprising the first oversampling rate of the first dimension, the first oversampling rate of a second dimension, and the first CSI measurement. The subsequent disclosure would describe the aforementioned steps in further details.

Figure 9:
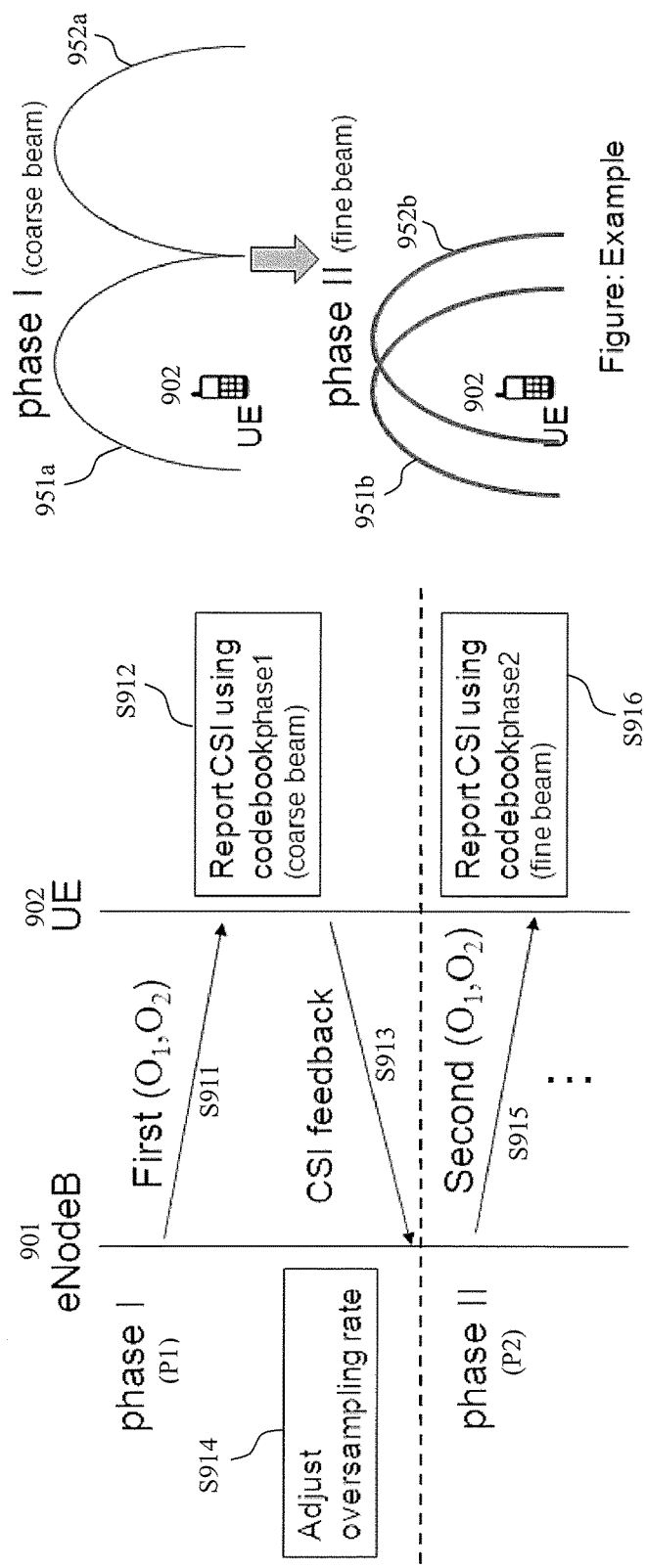
FIG. 9 illustrates a dynamic beamforming method based on an eNB adjusting an oversampling rate in accordance with one of the exemplary embodiments of the disclosure.

FIG. 9 illustrates a dynamic beamforming method based on an eNB adjusting the oversampling rate (e.g. ($O_1$, $O_2$)) in accordance with one of the exemplary embodiments of the disclosure. Based on KP-based dual-stage codebook design as previously described, in phase I (P1), the eNB 901 could make the codebook size coarse with s a smaller $O_1$ and/or $O_2$ when a UE 902 attached to the eNB 901 initially. Then in phase II (P2), the eNB 901 based on UE feedback information in phase I (P1) may change the codebook size by adjusting oversampling rate. Coarse beams would mean that two beams 951a 952a would be further spaced apart; whereas fine beams would mean that two beams 951b 952b would be spaced closer than coarse beams such as 951a 952a.

Referring to FIG. 9, in step S911, the eNB 901 during phase I (P1) would transmit a configuration message which may include not limited to a first oversampling rate (e.g. ($O_1$, $O_2$)) to the UE 902. The first oversampling rate could be a lower sampling rate and thus the resolution of the transmitted beam group would be coarse. The UE, for example, could be recently attached to the eNB or awoken from a sleep mode. In step S912, the upon receiving the reference signal (e.g CSI-RS) and the first configuration message, the UE 902 may perform a measurement (e.g. CSI measurement) based on the reference signal and the first oversampling rate and subsequently in step S913 transmit the measured data to the eNB 901 based on the reference signal and the first oversampling rate. The measured data could be channel state information (CSI) associated with a particular channel. In step S914, in response to receiving the information feedback of the measured data, the eNB 901 may implement phase II (P2) by adjusting from the first oversampling rate into a second oversampling rate and by doing so change the codebook size where the second oversampling rate would be larger than the first oversampling rate. In step S915, the eNB 901 would transmit a second configuration message which may include not limited to a second oversampling rate which would result in finer beams resolutions. In other words, the second oversampling rate of the first dimension could be greater than the first oversampling rate of the first dimension. In steps S916, the UE 902 may perform another iteration by performing CSI measurement based on a second reference signal and the second oversampling rate. Subsequently, the UE may transmit another measured CSI to the eNB 901 based on the second oversampling rate, and the eNB 901 may adjust from the second oversampling rate into a third oversampling rate, which could be larger or smaller than the second oversampling rate. In other words, the eNB would decide to go back to phase I (with smaller oversampling rate) or enter phase III (with larger oversampling rate).

Codebook subset restrictions could be implemented in various ways. After a UE has received from an eNB a first radio resource control (RRC) signaling related to codebook configurations, in response to receiving a CSI reporting (e.g. receiving a PMI) from the UE, the eNB may determine to centralize the codebook restriction to the long term PMI (e.g. by selecting the long term PMI), align with the long-term PMI region (i.e. beam group region), or shorten (make partial) the long term-PMI region by either reducing the CSI feedback overhead or by temporarily fixing or freezing the CSI feedback overhead. Each of these alternatives are further elucidated in FIG. 11~FIG. 15 are their corresponding written descriptions.

The parameters used for the examples of FIG. 11~FIG. 15 are shown in FIG. 10. For these examples, it is assumed that the number of antenna ports are 8, $(N_1, N_2)=(2, 2)$, and $(O_1, O_2)=(4, 4)$, $(8, 8)$. Also, the codebook configuration 3 with the checkerboard pattern is assumed for most of the subsequent exemplary embodiments. However, it should be noted that it is well known by an ordinary person skilled in the art that an oversampling rate of a first dimension could be different from an oversampling rate of a second dimension. Moreover, the codebook configuration may also vary in actual practice.

Figure 11:
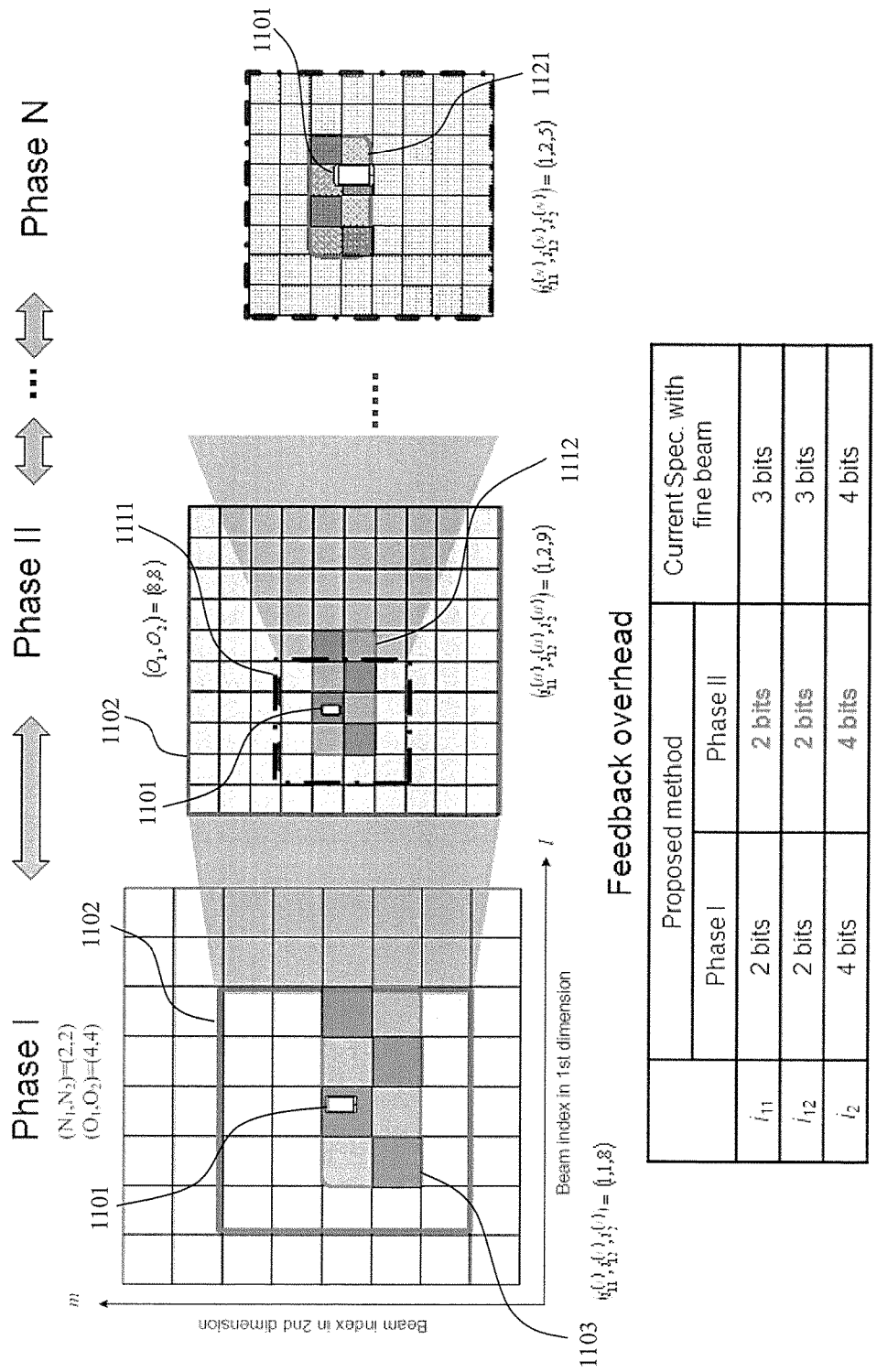
FIG. 11 illustrates an example of centralizing codebook restriction to the long-term PMI based on the method of FIG. 9 in accordance with one of the exemplary embodiments of the disclosure.

FIG. 11 illustrates an example of centralizing codebook restriction to the UE-selected PMI (e.g. by selecting the long term PMI) based on the method of FIG. 9 in accordance with one of the exemplary embodiments of the disclosure. In this example, assuming that the UE 1101 has just attached to an eNB, during phase I, the eNB would transmit a configuration message to configure an oversampling rate having at least two dimensions. The oversampling rate would result in transmissions having coarse beams with the numbers of ports of 2 in both the first dimension and the second dimension and with oversampling rate of 4 in both the first dimension and the second dimension. The eNB would also transmit a reference signal such as a CSI-RS. The UE 1101 is assumed to be covered by the beam group 1103 and have subsequently selected the beam having the beam index (e.g. PMI) $(i_{11}^{(I)}, i_{12}^{(I)}, i_2^{(I)})=(1, 1, 8)$ as the eNB selects a first long term PMI which indicates the beam group 1103. Consequently, in response to receiving a measurement report (e.g. CSI) of the reference signal, the eNB may determine, based on the stability of the information of the measurement report (e.g. first information feedback) such as the CSI, to restrict the codebook restriction to a first subset 1102 in order to reduce the feedback overhead. The first subset 1102 is larger than the long term PMI. The restricted first subset 1102 of the codebook could be communicated from the eNB to the UE 1101 via a first radio resource control (RRC) signaling.

During phase II, as the UE 1101 is covered by another beam group with a different beam 1112 indicated by the beam index $(i_{11}^{(II)}, i_{12}^{(II)}, i_2^{(II)})=(1,2,9)$, the eNB may increase the oversampling rate $(O_1, O_2)$ to $(8, 8)$. This is shown by the increased number of grids of the central figure of FIG. 11. All the grids of the central figure are within the first codebook subset. The increase number of grid as the result of increased oversampling rate would increase the resolution of the grid of beams. The first codebook subset would decrease the search space of the UE 1101 and thus improve the computational efficiency of the UE 1101. Based on receiving another measurement report, the eNB may determine to further restrict the codebook size into a second subset 1111 which is smaller than the first subset 1102 in order to further decrease the PMI feedback overhead. The restriction of the codebook into the second subset 1111 could be communicated from the eNB to the UE 1101 via a second RRC signaling. Otherwise, based on the measurement report, the eNB may determine to increase the coverage of the beam group by reverting back to phase I which is to decrease the oversampling rate and to enlarge the codebook subset such as to adopt the first subset 1102.

The UE 1101 may enter phase III with an even larger oversampling rate. For each phase in which the UE 1101 is situated in, the UE 1101 may revert back to phases with lower oversampling rate or greater phases with greater oversampling rate. Entering greater phases is helpful for reducing the computational complexity and feedback overhead; whereas reverting to lower phases would increase the subset of the codebook. Further, assuming that the eNB operates in phase N−1, the UE 1101 may receive even finer beams with an even greater oversampling rate by selecting another beam group 1121 with sufficient coverage to operate a measurement. For example, in phase N, the UE may select beam index (e.g. PMI) $(i_{11}^{(N)}, i_{12}^{(N)}, i_2^{(N)})=(1, 2, 5)$. It is worth noting in FIG. 11 that the feedback overhead is not only reduced but is constant between phase I and phase II.

It is worth noting that in the examples of FIG. 11~FIG. 15B, even though during the phase II in which a beam group having fine beams is used, The oversampling rate could be lowered so that the UE may return back to phase I by adjusting the beam group back to coarse beams. Similarly, during phase II, the oversampling rate could be adjusted several times in order to adjust the coverage of the UE based on a variety of factors including the speed and direction of the UE. It is also worth noting that, in general, the oversampling rate in phase N could be adjusted to be greater or lower at least in the first dimension or at least in the second dimension or both relative to phase N−1. For example in phase II, the oversampling rate could be greater or lower than phase I in the first dimension while the oversampling rate in the second dimension remain unchanged.

Figure 12:
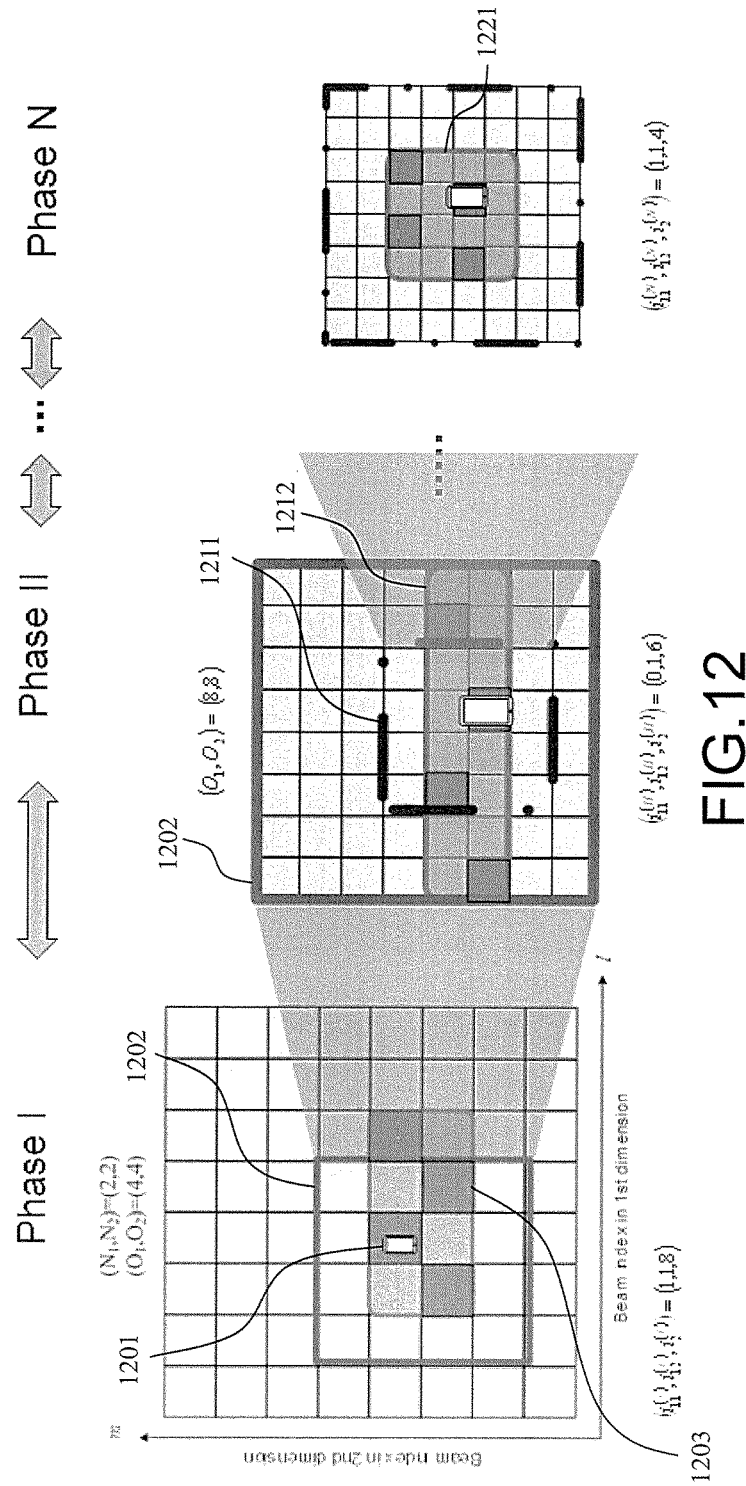
FIG. 12 illustrates an example of centralizing codebook restriction to the long-term PMI with varying beam group size based on the method of FIG. 9 in accordance with one of the exemplary embodiments of the disclosure.

FIG. 12 illustrates an example of centralizing codebook restriction to the UE-selected PMI (e.g. by selecting the long term PMI) with different beam group size to enhance beam group coverage in order to fit the coverage of the channel angular spread. Based on the method of FIG. 9 in accordance with one of the exemplary embodiments of the disclosure. During phase I, similar to FIG. 11, the eNB would begin by transmitting a reference signal having coarse beams with $(N_1, N_2)=(2, 2)$ and $(O_1, O_2)=(4, 4)$. The UE 1201 is assumed to be covered by the beam group 1203 having a first beam group size and have subsequently selected the beam having the beam index $(i_{11}^{(I)}, i_{12}^{(I)}, i_2^{(I)})=(1, 1, 8)$ as the eNB has selected a first long term PMI which indicates the beam group 1103. In response to receiving a measurement report of the reference signal, the eNB may restrict the codebook restriction to a first subset 1202 based on information feedback (e.g. CSI feedback) in order to reduce the feedback overhead. The restricted first subset 1202 of the codebook could be communicated from the eNB to the UE 1201 via a first radio resource control (RRC) signaling.

During phase II, according to the UE feedback information such as the CSI feedback, the eNB may increase the oversampling rate. As the UE 1201 operates under a higher resolution of grid-of-beam, the eNB may increase the size of the first beam group 1203 to be a second beam group 1212 having the beam index $(i_{11}^{(II)}, i_{12}^{(II)}, i_2^{(II)}) = (0, 1, 6)$ which is larger than the first beam group. Since the oversampling rate has become large, the beam group size could be enlarged to fit the spatial coverage of channel angular spread. The eNB may further restrict the codebook size into a second subset 1211 which is smaller than the first subset 1202 and increase the oversampling rate $(O_1, O_2)$ from (4, 4) to (8, 8). In general, the oversampling rate could be expressed as $(O_1, O_2) = 2^{k_1^{(N)}}, 2^{k_2^{(N)}})$ where $(2^{k_1^{(N)}}, 2^{k_2^{(N)}}) \geq (2^{k_1^{(N-1)}}, 2^{k_2^{(N-1)}})$. More generally, the oversampling rate be expressed as $O_d$ where $O_d = 2^{k_d^{(N)}}$, and $k_d^{(N)}$ is an integer with subscript d stands for the dimension and superscript (N) stands for the phase. The restriction of the codebook into the second subset 1211 could be communicated from the eNB to the UE 1201 via a second RRC signaling. Further, the eNB may commence phase N by selecting a beam group 1221 having the beam index $(i_{11}^{(N)}, i_{12}^{(N)}, i_2^{(N)}) = (1, 1, 4)$. The beam group 1221 is selected based on the increased oversampling rate which results in high resolution and lesser beam group coverage. This causes the beam group size to increase.

Figure 13:
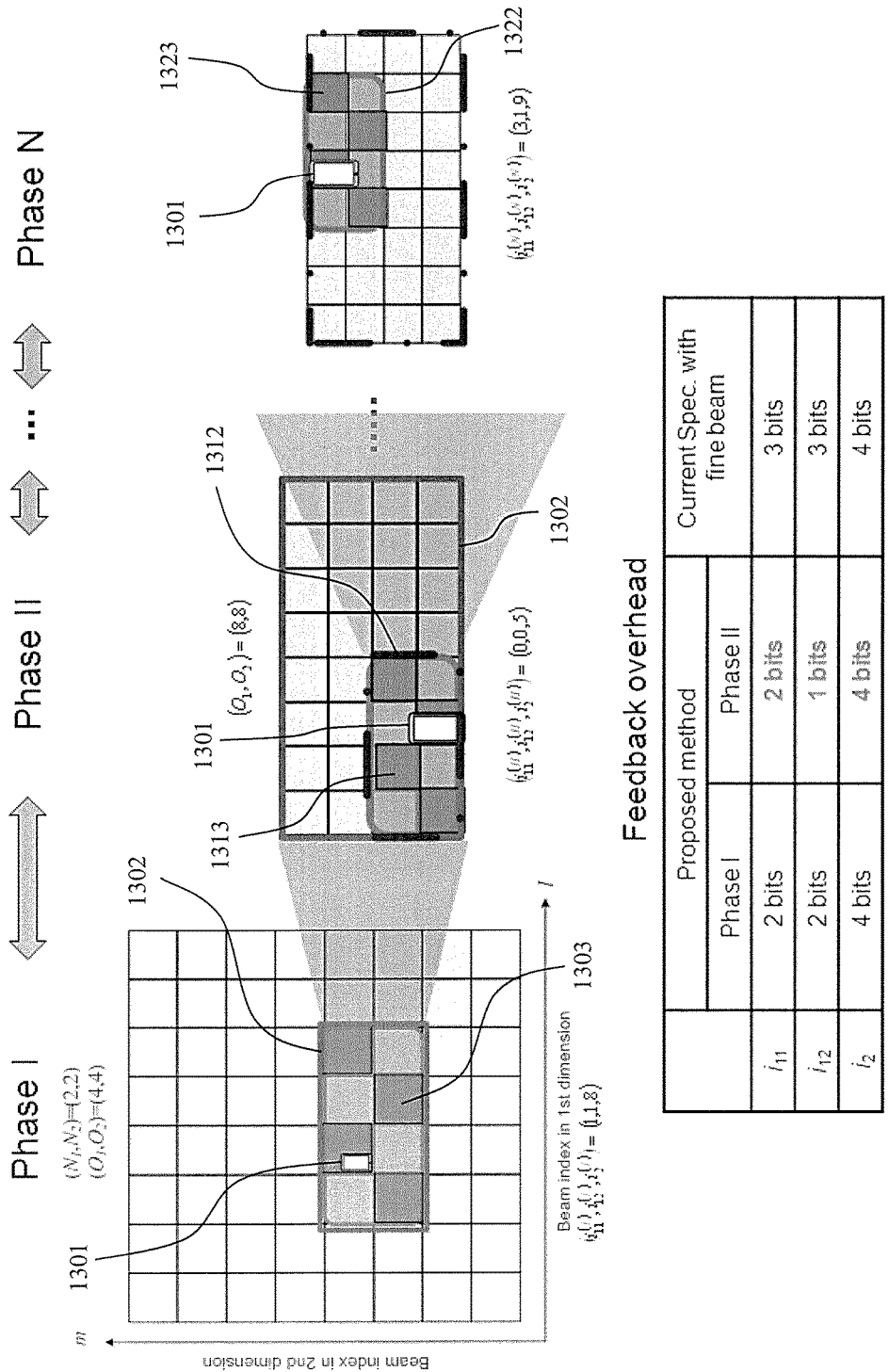
FIG. 13 illustrates an example of aligning codebook restriction with long-term PMI region based on the method of FIG. 9 in accordance with one of the exemplary embodiments of the disclosure.

FIG. 13 illustrates an example of aligning codebook with long-term PMI region (e.g. by selecting the long term PMI) based on the method of FIG. 9 in accordance with one of the exemplary embodiments of the disclosure. In this example, the occurring of phase I is assumed to be identical to the previous two examples except that, for the purpose of reducing the feedback overhead, the eNB may restrict the codebook restriction to a first subset 1302 which is identically aligned with the long term PMI region as indicated by a first beam group 1303 having the beam index $(i_{11}^{(I)}, i_{12}^{(I)}, i_2^{(I)}) = (1,1,8)$. In other words, the eNB would select the first long term PMI, and the first subset 1302 would be identical to the first long term PMI The restricted first subset 1302 of the codebook could be communicated from the eNB to the UE via a first radio resource control (RRC) signaling.

During phase II, assuming that the UE 1301 has selected the beam index $(i_{11}^{(II)}, i_{12}^{(II)}, i_2^{(II)}) = (0,0,5)$, the eNB may increase the oversampling rate $(O_1, O_2)$ to (8, 8) in order to increase the resolution of the second beam group 1313 as indicated by a second long term PMI. To reduce the PMI overhead, the eNB may further restrict the codebook into a second subset 1312 which is identically aligned with the second beam group 1313 having the beam index $(i_{11}^{(II)}, i_{12}^{(II)}, i_2^{(II)}) = (0,0,5)$ based on the stability of the measurement report. The restriction of the codebook into the second subset 1312 could be communicated from the eNB to the UE via a second RRC signaling. After receiving another measurement report, the eNB may commence phase N by further increasing the oversampling rate and select a beam group 1323. During phase N, the UE for example may select the beam index $(i_{11}^{(N)}, i_{12}^{(N)}, i_2^{(N)}) = (3,1,9)$ It is worth noting that in FIG. 13 the feedback overhead can further be reduced relative previous examples by reducing the feedback overhead for phase II.

Figure 14:
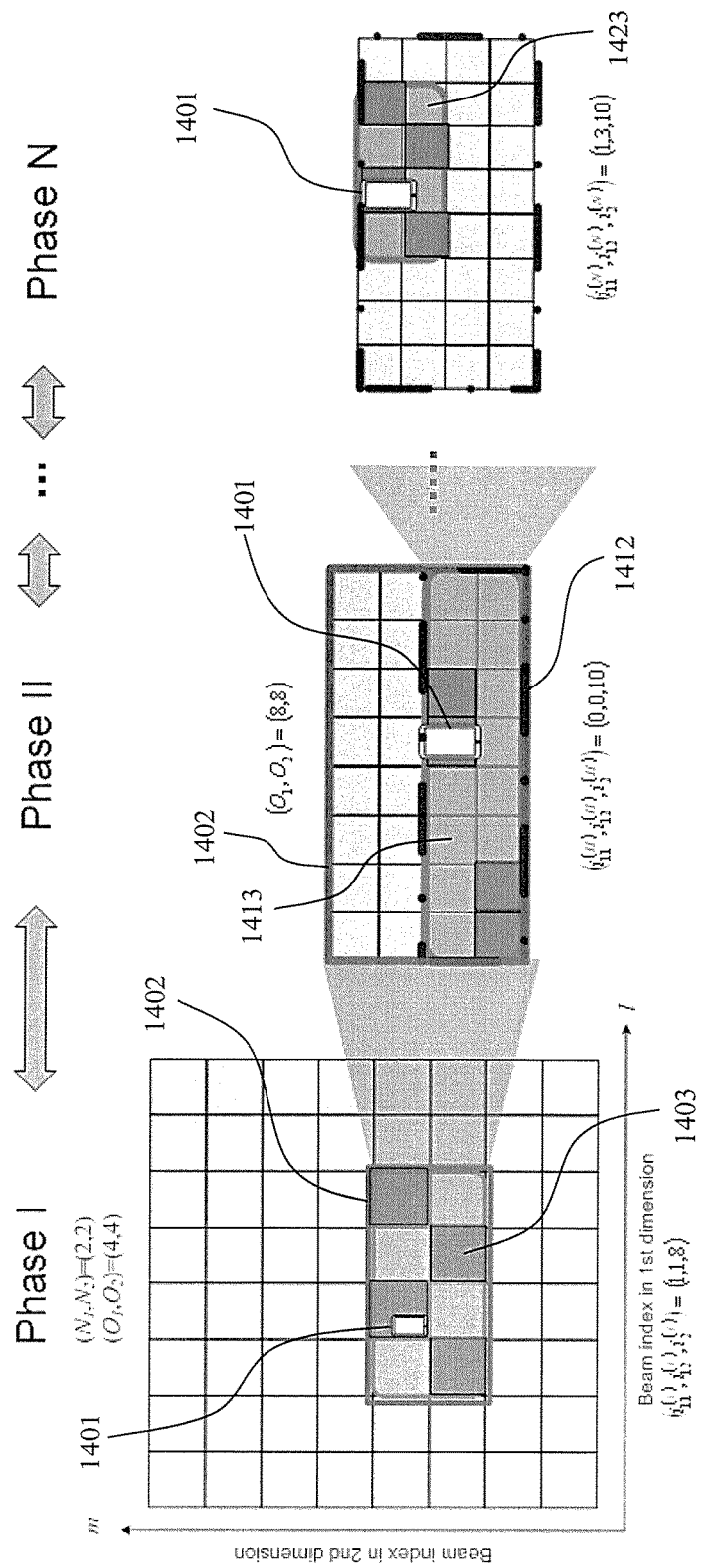
FIG. 14 illustrates an example of aligning codebook restriction with long-term PMI region with varying beam group size based on the method of FIG. 9 in accordance with one of the exemplary embodiments of the disclosure.

FIG. 14 illustrates an example of aligning codebook with long-term PMI region (e.g. by selecting the long term PMI) with varying beam group size based on the method of FIG. 9 in accordance with one of the exemplary embodiments of the disclosure. In this example, during phase I, the eNB may begin transmitting coarse beams with $(N_1, N_2) = (2, 2)$ and $(O_1, O_2) = (4, 4)$ as the UE 1401 is assumed to be covered by the first beam group 1403 as indicated by the a long term PMI and have subsequently selected the beam having the beam index $(i_{11}^{(I)}, i_{12}^{(I)}, i_2^{(I)}) = (1, 1, 8)$. The eNB may then restrict the codebook restriction to a first subset 1402 in order to reduce the feedback overhead. The first subset 1402 may identically align with the first beam group 1403. The restricted first subset 1402 of the codebook could be communicated from the eNB to the UE 1401 via a first radio resource control (RRC) signaling.

During phase II, the UE 1401 is assumed to be covered by a second beam group 1413 as indicated by a second long term PMI and select the beam index $(i_{11}^{(I)}, i_{12}^{(I)}, i_2^{(I)}) = (0, 0,10)$. The second beam group 1413 during phase II could be of a different size (e.g. larger) than the first beam group 1403 during phase I. It is worth noting that the second beam group 1413 may no longer be based on codebook configuration 3 with the checkboard pattern but may actually be another configuration. In other words, the second long term PMI has a different codebook configuration from the first PMI. Even though the beam group is no longer the same configuration, the codebook size of the second subset 1412 could be identical to the first subset 1402 or further restricted from the first subset 1402 but oversampling rate $(O_1, O_2)$ to (8, 8) would be increased to increase the resolution of the second beam group 1413. The change of the codebook into the second subset 1412 could be communicated from the eNB to the UE via a second RRC signaling. At phase N, the eNB may select a beam group 1423 having the beam index $(i_{11}^{(N)}, i_{12}^{(N)}, i_2^{(N)}) = (1,3,10)$ which is the same size as the first beam group, but the codebook size may remain the same.

Figure 15A:
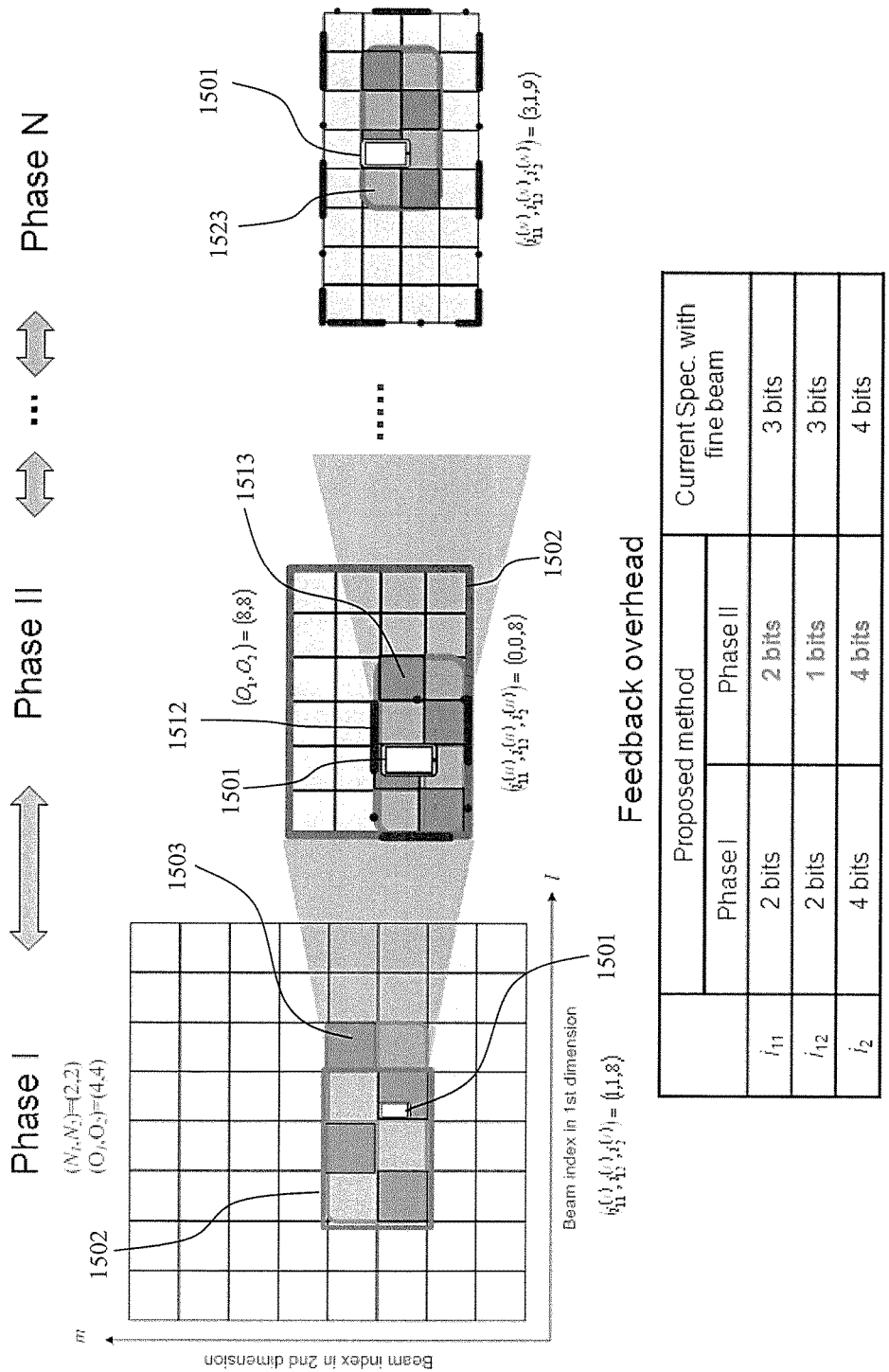
FIG. 15A illustrates a first example of restricting codebook in a partial or shortened long-term PMI region in accordance with one of the exemplary embodiments of the disclosure.

FIG. 15A illustrates a first example of restricting codebook in a partial or shortened long-term PMI region (e.g. by selecting the long term PMI) in accordance with one of the exemplary embodiments of the disclosure. In this example, the eNB may transmit with coarse beams with $(N_1, N_2=2, 2)$ and $(O_1, O_2=4, 4)$. The UE 1501 is assumed to be covered by the first beam group 1503 as indicated by a first long term PMI and have subsequently selected the beam having the beam index $(i_{11}^{(I)}, i_{12}^{(I)}, i_2^{(I)}) = (1, 1, 8)$. In this example, the eNB would restrict the codebook to a first subset 1502 in order to reduce the feedback overhead. The first subset 1502 is smaller than the first long term PMI. The restricted first subset 1502 of the codebook could be communicated from the eNB to the UE 1501 via a first radio resource control (RRC) signaling. However, the first subset 1502 would be a partial or shortened long-term PMI region which is covered by the first beam group 1503.

During phase II, assuming that the UE 1501 is covered by a second beam group 1513 as indicated by a second long term PMI and has selected the beam index $(i_{11}^{(II)}, i_{12}^{(II)}, i_2^{(II)}) = (0,0,8)$, the eNB may further restrict the codebook size into a second subset 1512 which is, however, is still a partial or shortened long-term PMI or region of the second beam group 1513. The eNB may also increase the oversampling rate $(O_1, O_2)$ to (8, 8). The restriction of the codebook into the second subset 1512 could be communicated from the eNB to the UE 1501 via a second RRC signaling. Further, the eNB may commence phase N by transmitting a second set of fine beams and selecting another beam group 1523 having the beam index $(i_{11}^{(N)}, i_{12}^{(N)}, i_2^{(N)}) = (3,1,9)$ also having oversampling rate $(O_1, O_2)$ of (8, 8). The value of oversampling rate in phase N may be larger than the previous phase at least in a certain dimension such as at least the first dimension or at least the second dimension or both. It is worth noting that in FIG. 15, the feedback overhead is further reduced as the feedback overhead for phase II is less than the feedback overhead for phase I.

Figure 15B:
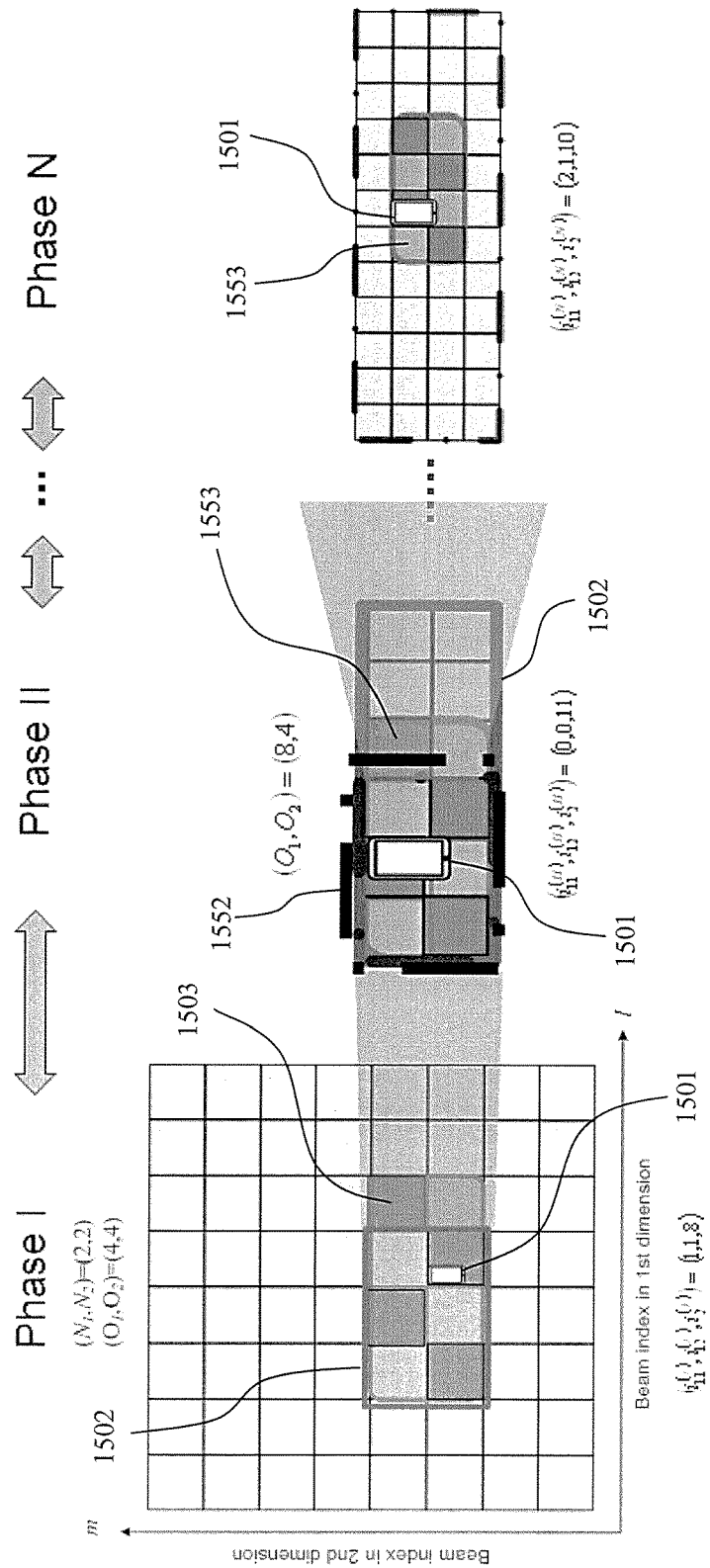
FIG. 15B illustrates a second example of restricting codebook in a partial or shortened long-term PMI region in accordance with one of the exemplary embodiments of the disclosure.

FIG. 15B illustrates a second example of restricting codebook in a partial or shortened long-term PMI region in accordance with one of the exemplary embodiments of the disclosure. The second example is similar to the first example. However, it is worth noting that for phase II, the oversampling rate of the first dimension could be different from the oversampling rate of the second dimension. In this particular example, the oversampling rate of the first dimension is 8, and the oversampling rate of the second dimension is 4.

In addition to a dynamic beamforming method used by an eNB which adjusts oversampling rate based on receiving CSI, the dynamic beamforming method may also be UE assisted. In this way, the eNB may transmit configuration messages to a UE and dynamically adjust the precoding matrix parameters based on information received from the UE. In particular, the precoding matrix parameters may include not limited to antenna configuration (e.g. $N_1$, $N_2$), oversampling rate ($O_1$, $O_2$), codebook configuration (e.g. 1, 2, 3, 4), PMI search space (CSR), and FD-MIMO operation (e.g. non-precoded (NP)) or beamformed (BF). The NP FD-MIMO operation would include the use of long term and/or short term PMI, and the BF FD-MIMO operation would include the use of PMI configuration. If the oversampling rate is 8, the PMI is explicitly quantized; if the oversampling rate is 4, the PMI is implicitly quantized.

The principle of operation could be summarized as follows. A UE would receive one or more configuration (i.e. UE-assisting messages) from an eNB. The UE assisting message may include not limited to a set of oversampling rates (e.g. a first ($O_1$, $O_2$), a second ($O_1$, $O_2$), and so on.), UE-assisting information such as speed and heading/direction, the mode of CSI feedback transmission, and etc. As the UE receives the UE-assisted message, the UE may perform CSI measurement and report the measured CSI based on parameters of the UE-assisting message. In particular, the UE may report the CSI measurement based on one particular oversampling rates of the received set of oversampling rates, based on multiple oversampling rates of the received set of oversampling rates, or based on all of the received set of oversampling rates. The selection of the oversampling rate(s) by the UE could be determined based on various factors such as the movement of the UE. In general, if the UE is moving, then a lower oversampling rate could be selected; and if the UE is moving slowly or stationary, a higher oversampling rate could be selected instead. When operating under periodic CSI mode, the UE under a presetting time intervals Γ may report the same PMI, a different long-term PMI, or a different short-term PMI. The details of the principle of operation is further elucidated in FIG. 16~19 and their corresponding written descriptions.

Figure 16:
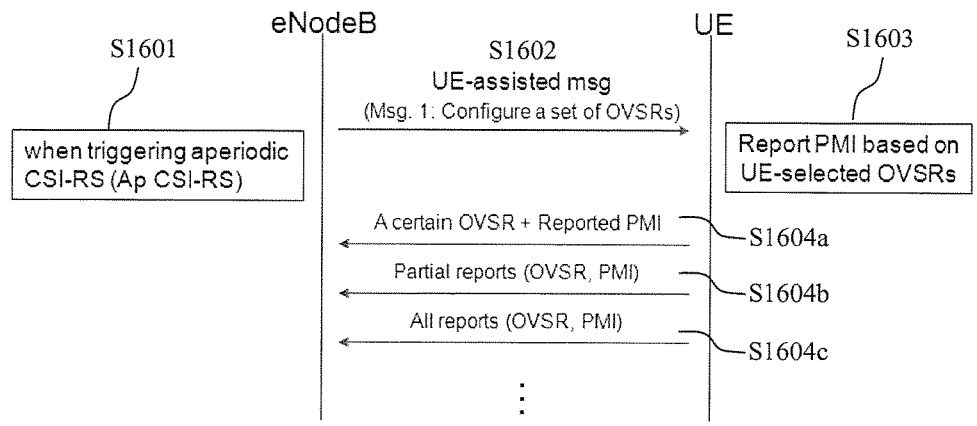
FIG. 16 illustrates reporting CSI based on UE selected oversampling rate(s) in accordance with one of the exemplary embodiments of the disclosure.

The UE-assisting message may include information to assist a UE to determine beam group related parameters. FIG. 16 illustrates reporting CSI based on UE selected oversampling rate(s) in accordance with one of the exemplary embodiments of the disclosure. In step S1601, it is assumed that an event has triggered the eNB to transmit an aperiodic CSI-RS (Ap CSI-RS). Before transmitting the Ap CSI-RS, in step S1602 the eNB would transmit a first configuration message (FIG. 16 Msg. 1) which may include not limited to a set of oversampling rates a first ($O_1$, $O_2$), a second ($O_1$, $O_2$) . . . a $n^{th}$ ($O_1$, $O_2$) and so forth to the UE. The different oversampling rates are different sizes. In response to receiving the first configuration message, in step S1603 the UE may and select one or more optimal oversampling rates and subsequently perform CSI measurement based on the selected oversampling rate. The selection of oversampling rates could be based on maximum power of the transmission, the MU-MIMO pairing consideration, the speed of the UE (e.g. whether it is fast moving, slow moving, stationary, and etc.), and so forth.

The UE may then transmit the measured CSI or PMI to the eNB according to one of at least three possibilities based on the oversampling rates selected. In step S1604a, the UE may transmit a particular oversampling rate which has been selected by the UE along with the CSI measurements based on the particular oversampling rate to the eNB. Alternatively, in step S1604b, the UE may transmit to the eNB multiple selected oversampling rates along with CSI measurements based on the multiple selected oversampling rates. Alternatively, in step S1604c, the UE transmits to the eNB all of the oversampling rates and the CSI measurements based on all of the oversampling rates. The UE may report the CSI measurements to the eNB by using a Physical Uplink Shared Channel (PUSCH) for large oversampling rate(s) and by using a Physical Uplink Control Channel (PUCCH) for small oversampling rate(s). The UE may report the CSI aperiodically (A-CSI) for large oversampling rate(s) and may report the CSI periodically (P-CSI) for small oversampling rate(s).

In addition to FIG. 16, the eNB may also transmit another UE-assisted message by means such as a RRC message configured by a higher layer. For the exemplary embodiment of FIG. 17, the UE assisted message may include UE-assisting information such as information that is reported at PUSCH or Sounding Reference Signal (SRS) and could be used to determine the speed and direction of the UE. The UE could then report the CSI measurement by selecting an oversampling rate which could be selected based on the movement information of the UE.

In step S1701, it is assumed that an event has triggered the eNB to transmit an aperiodic CSI-RS (Ap CSI-RS). In step S1702 the eNB would transmit a second configuration message (FIG. 17 Msg. 2) which could be configured by higher layer and transmitted through RRC. The second configuration message may include UE-assisting information including information that could be used to the UE to determine the speed and direction which could be reported at PUSCH or SRS. In response to receiving the second configuration message, in step S1703 the UE may and select one or more optimal oversampling rates based on the moving information of the UE. The UE may obtain the moving information by detecting its movement within certain subframes by using a global positioning system (GPS) or a Gyro sensor which could be disposed within the UE.

The relationship between the oversampling rate selected by the UE and the speed of the UE per dimension is shown in FIG. 18. The speed of the UE could be derived by the UE moving detection mechanism. The horizontal of FIG. 18 could be divided according different sections of $\Lambda^{(d)}_k$ where d is the dimensional number and k is the value which divides speed into k+1 sections with each section corresponds to a range of speed and a particular oversampling rate. In practice, for example, the speed of the UE may first be determined based on various existing techniques. When the speed of the UE has been determined, the oversampling rate could be adjusted accordingly. For instance, when the speed of the UE is low, the first oversampling rate of the first dimension and/or the oversampling rate of the second dimension could be selected as relatively high oversampling rate, and when the speed of the UE is high, the first oversampling rate of the first dimension and/or the oversampling rate of the second dimension could be selected as relatively low oversampling rate.

After one or more oversampling rates have been selected by the UE, the UE perform CSI measurements which correspond to the oversampling rates selected. The UE may then transmit the measured CSI or PMI to the eNB according to one of at least three possibilities based on the oversampling rates selected. In step S1704a, the UE may transmit a particular oversampling rate which has been selected by the UE along with the CSI measurements based on the particular oversampling rate to the eNB. Alternatively, in step S1704b, the UE may transmit to the eNB multiple selected oversampling rates along with CSI measurements based on the multiple selected oversampling rates. Alternatively, in step S1704c, the UE transmits to the eNB all of the oversampling rates and the CSI measurements based on all of the oversampling rates.

Figure 17:
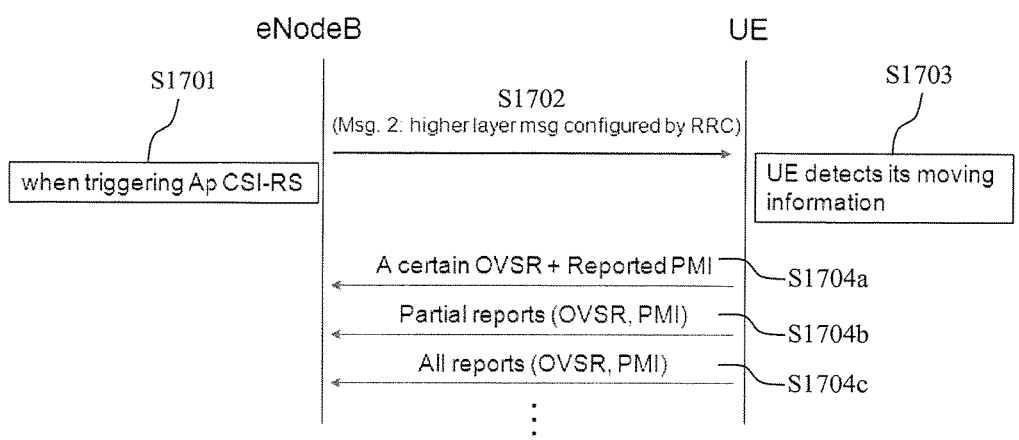
FIG. 17 illustrates a UE selecting oversampling rate(s) based on UE-assisting information in accordance with one of the exemplary embodiments of the disclosure.

Moreover, in addition to the exemplary embodiments of FIG. 16 and FIG. 17, the eNB may transmit a UE assisting message to configure a CSI reporting mode and a time window. The UE may then select the oversampling rate based on whether the PMI indicator is the same or different. FIG. 19 illustrates another exemplary embodiments of using a UE assisting message. In step S1901, the eNB may transmit to the UE a third configuration message (i.e. UE assisting message) which may include not limited to an indicator which sets the P-CSI mode and a time window, F. In response to receiving the third configuration message, in step S1902 the UE would perform the CSI measurement and select a corresponding PMI indicator. Consequently, the UE would determine whether the same PMI indicator has been selected within the time window, F. In step S1903a, if different PMI indicators have been selected within F, then in step S1904a, the eNB would know that a larger oversampling rate has been selected and may decide to configure a smaller oversampling rate. Alternatively, in step S1903b, if the same PMI indicators have been selected within F, then in step S1904b, the eNB would know that a smaller oversampling rate has been selected and may decide to configure a larger oversampling rate.

In another exemplary embodiments, a beam group configuration could be formed by combining multiple stages of beam group columns. Each beam group is non-overlapping from other beam groups and could be defined by parameters including at least a dimension, an oversampling rate, an offset value, and a down-sampling factor. A stage could be formed by selecting columns of multiple non-overlapping beams groups, and a beam group configuration could be formed by combining multiple stages of columns.

Figure 20:
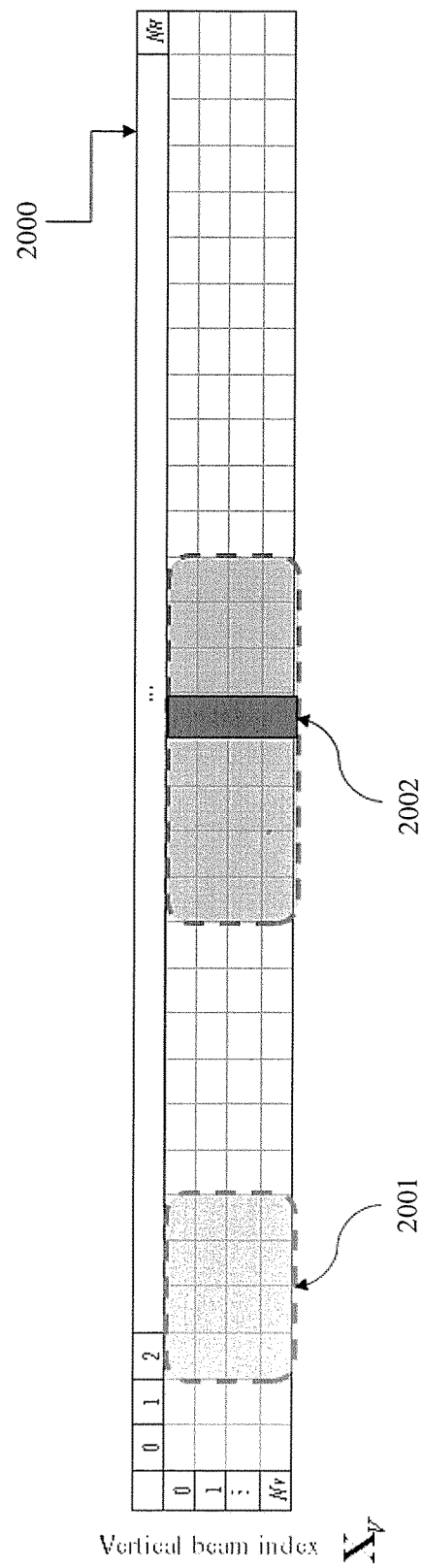
FIG. 20 illustrates the concept of configuring a beam group in a grid of beam matrix in accordance with one of the exemplary embodiments of the disclosure.

FIG. 20 illustrates the concept of configuring a beam group in a grid of beam matrix in accordance with one of the exemplary embodiments of the disclosure. A beam group 2001 could be configured as a subset of an overall grid of beam matrix. The overall grid of beams 2000 which could be expressed as expressed as $[X_H \otimes X_V]$ could be formed by oversampling one or both of a horizontal and a vertical domain, and the grid of beams 2000 could be partitioned into a plurality of non-overlapping beam groups. Each of the beam groups could vary in sizes relative to other beam groups. A subset of beams could be chosen from each group to form a codebook. For example, a subset of beams 2002 could be chosen from the group to form a codebook. The particular subset 2002 contains only a partial column of a beam group in the horizontal domain in terms of oversampling rate ($O_H$) while all beams of the beam group in vertical domain is selected. In other words, the particular subset 2002 is one of the horizontal beam index $X_H = [b_0\ b_1\ \ldots\ b_{N_N-1}]$.

Figure 21:
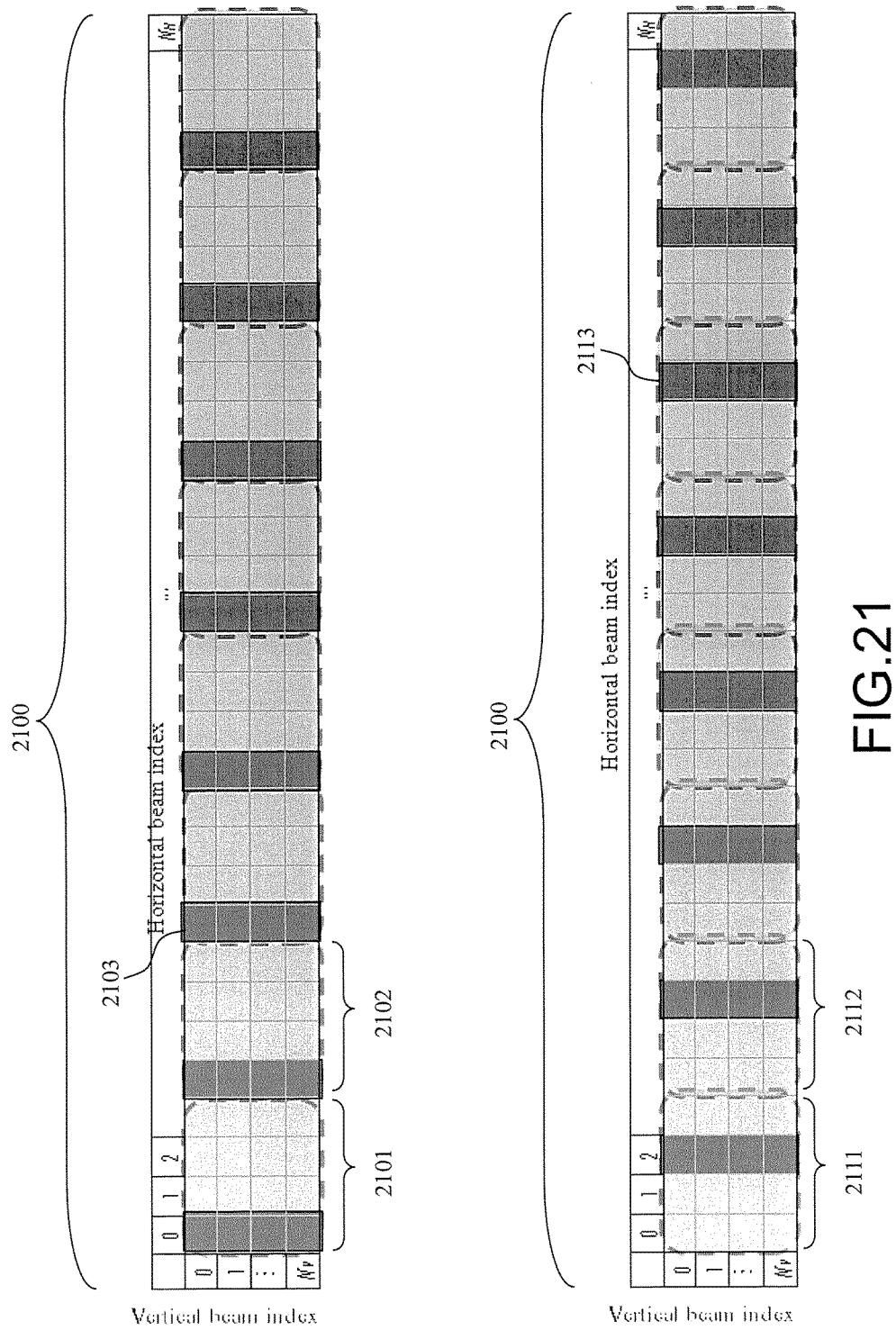
FIG. 21 illustrates selecting a certain column in each non-overlapping beam group of the same size in accordance with one of the exemplary embodiments of the disclosure.

As shown in FIG. 21, a grid of beams could be partitioned into a plurality of non-overlapping beam groups selecting a certain column in each non-overlapping beam group with the same size. For example, the first grid of beams 2100 could be partitioned into multiple non-overlapping beam groups including a first beam group 2101 and a second beam group 2102. The first beam group 2101 and the second beam group 2102 are non-overlapping. The left most column (e.g. 2103) of each beam group could be selected. For another example, the second grid of beams 2100 could be partitioned into multiple non-overlapping beam groups including a first beam group 2111 and a second beam group 2112. The first beam group 2111 and the second beam group 2112 are non-overlapping. The third column (e.g. 2113) counting from the left of each beam group could be selected.

Figure 22:
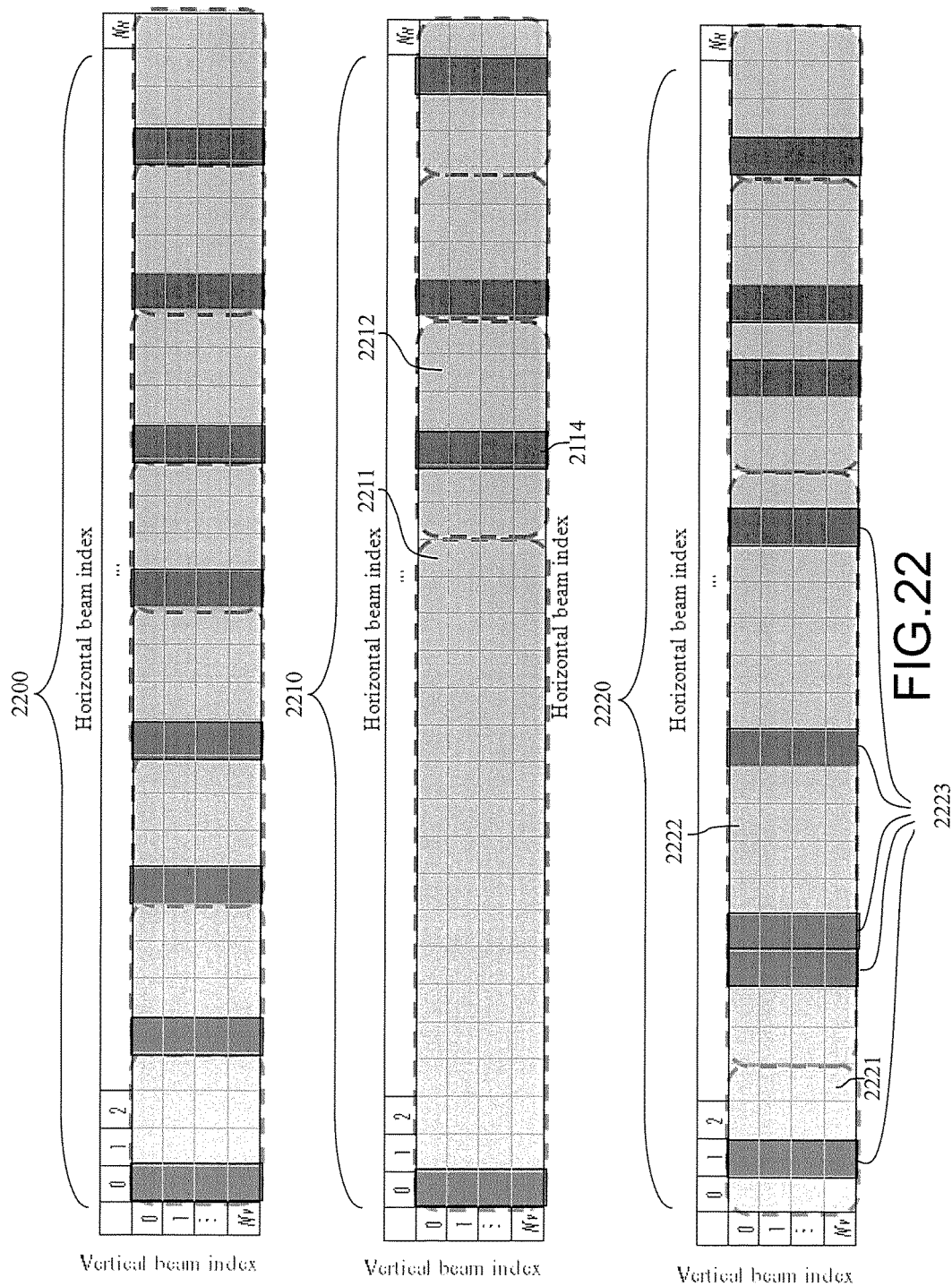
FIG. 22 illustrates selecting one or more columns of non-overlapping beam groups of the same or variable sizes in accordance with one of the exemplary embodiments of the disclosure.

As shown in FIG. 22, each beam group and selected columns could be configured in different ways. One specific column in each non-overlapping beam group having the same size could be selected. One such example could be seen in the first grid of beams in which one specific column in each non-overlapping beam group having the same size could be selected. Also, one specific column in each non-overlapping beam group could be selected, but each of the beam groups could have a different size relative to other beam groups. An example of such is shown in the second grid of beams 2210. Also the specific columns selected could vary from one beam group to another beam group. For example, the first beam group 2211 has a different size from the second beam group 2212, and the selected columns 2113 and 2114 are in different locations within each beam groups. Moreover, multiple specific columns in each non-overlapping beam group of variable sizes could be selected. For example, for the third grid of beams 2220, the first beam group 2221 has a different size from the second beam group 2222, and multiple columns 2223 from the second beam group could be selected.

Figure 23:
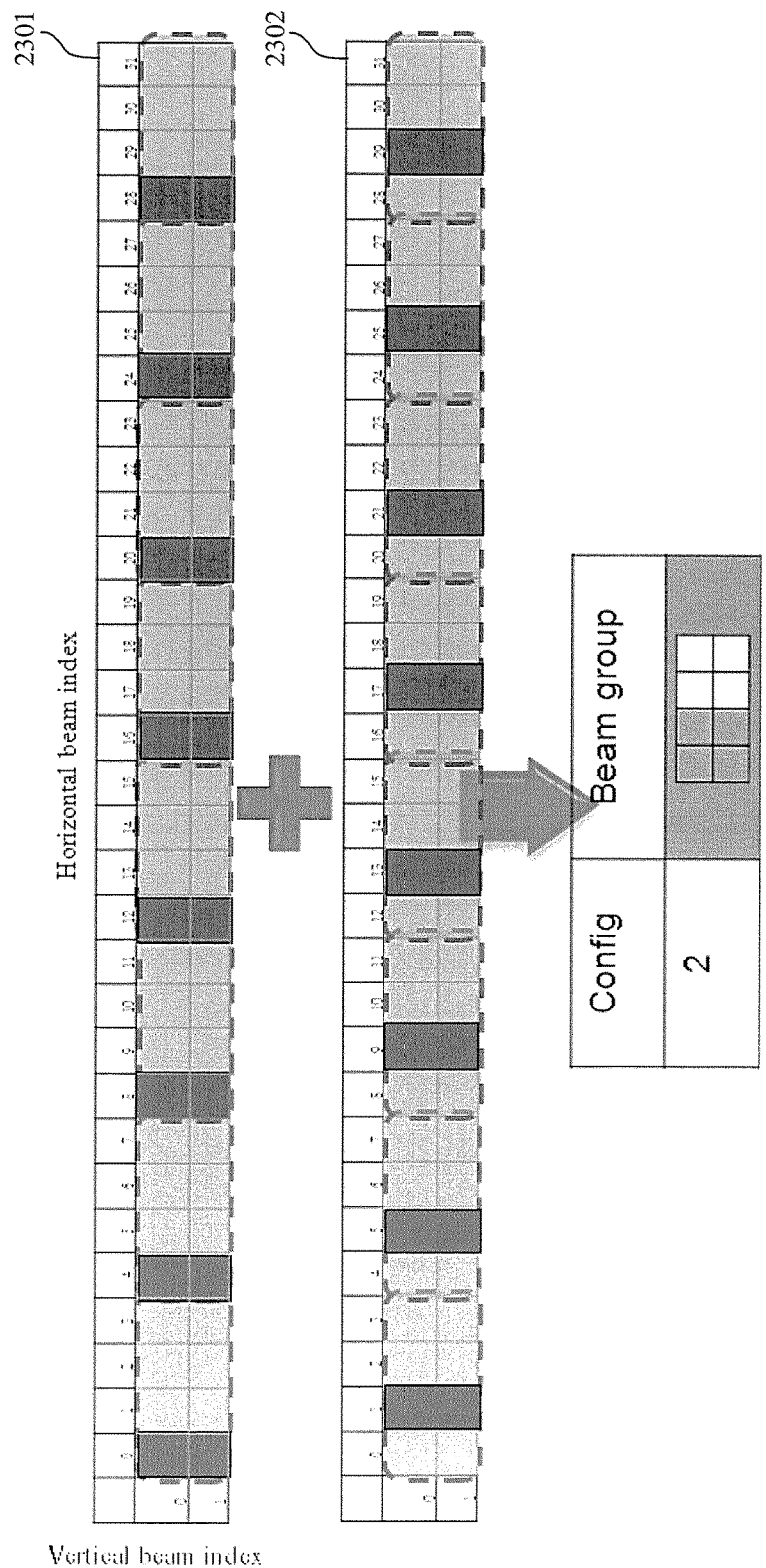
FIG. 23 illustrates a result of combining multiple stages of column selection in accordance with one of the exemplary embodiments of the disclosure.

FIG. 23 illustrates forming a beam group configuration by combining selected columns from multiple stages. For this example, the first stage 2301 is to be combined with the second stage 2302. It is assumed that the dimension of each of the beam groups is 4×2. More specifically, the horizontal dimension is 4 beam index wide and the vertical dimension is 2 beam index long. The beam group dimension could be determined via setting certain parameters including the offset value $O_{off}$ and the down sampling factor ($D_H$). First stage could be configured by setting the parameters as $O_{off}$ mod($N_H$, 4)=0 and $D_H$=32/8 (down-sampling rate)=4. Second stage could be configured by setting $O_{off}$ mod($N_H$, 4)=1; $D_H$=4. After combining the first stage and the second stage, the beam group configuration 2 could be formed. One example of forming beam group configuration 2 is illustrated in FIG. 24 which combines multiple precoders 2401 2402 2403 2404 as specified in TS 36.213 Section 7.2.4 to form beam group 2.

In view of the aforementioned descriptions, the present disclosure is suitable for being used in a wireless communication system and is able to dynamically adjust the oversampling rate for a specific dimension in order to reduce the feedback overhead related to the transmission of channel state information.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A dynamic beamforming method applicable to a base station, the method comprising:
   transmitting a first reference signal;
   transmitting a first configuration message comprising a first oversampling rate of a first dimension and a first oversampling rate of a second dimension;
   receiving a first information feedback of the first reference signal based on the first oversampling rate of the first dimension and the first oversampling rate of the second dimension in response to transmitting the first configuration message; and
   transmitting a second configuration message comprising a second oversampling rate of the first dimension and a second oversampling rate of the second dimension after receiving the first information feedback of the first reference signal.

2. The method of claim 1 further comprising:
   adjusting the first oversampling rate of the first dimension from a default value to be greater than the first oversampling rate of the first dimension.

3. The method of claim 1 further comprising:
   adjusting from the first oversampling rate of the first dimension to be greater or less than the second oversampling rate of the first dimension based on the first information feedback.

4. The method of claim 3 further comprising:
   adjusting from the second oversampling rate of the first dimension into a third oversampling rate of the first dimension based on a second information feedback, wherein the third oversampling rate of the first dimension is larger or less than the second oversampling rate of the first dimension.

5. The method of claim 4 further comprising:
   selecting a first long term precoder matrix indicator (PMI);
   restricting a codebook as a first subset of the codebook based on the first information feedback, wherein the first subset is larger than the first long term PMI; and,
   selecting a second long term PMI and restricting the codebook from the first subset into a second subset as the first oversampling rate of the first dimension is increased to the second oversampling rate of the first dimension.

6. The method of claim 4 further comprising:
   selecting a first long term PMI;
   restricting a codebook as a first subset of the codebook based on the first information feedback, wherein the first subset is larger than the first long term PMI; and
   selecting a second long term PMI and restricting the codebook from the first subset into a second subset as the first oversampling rate of the first dimension is increased to the second oversampling rate of the first dimension, wherein the second long term PMI is larger than the first long term PMI.

7. The method of claim 4 further comprising:
   selecting a first long term PMI;
   restricting a codebook as a first subset of the codebook based on the first information feedback, wherein the first subset is identical to the first long term PMI; and
   selecting a second long term PMI and restricting the codebook from the first subset into a second subset as the first oversampling rate of the first dimension is increased to the second oversampling rate of the first dimension.

8. The method of claim 4 further comprising:
   selecting a first long term PMI;
   restricting a codebook as a first subset of the codebook based on the first information feedback, wherein the first subset is identical to the first long term PMI; and
   selecting a second long term PMI and restricting the codebook from the first subset into a second subset as the first oversampling rate of the first dimension is increased to the second oversampling rate of the first dimension, wherein the second long term PMI has a different codebook configuration from the first long term PMI.

9. The method of claim 4 further comprising:
   selecting a first long term PMI;
   restricting a codebook as a first subset of the codebook based on the first information feedback, wherein the first subset is smaller than the first long term PMI; and
   selecting a second long term PMI and restricting the codebook from the first subset into a second subset as the first oversampling rate of the first dimension is increased to the second oversampling rate of the first dimension.

10. The method of claim 4 further comprising:
    adjusting from the first oversampling rate of the second dimension to the second oversampling rate of the second dimension, wherein the second oversampling rate of the first dimension is different from the second oversampling rate of the second dimension.

11. A base station comprising:
    a transmitter;
    a receiver; and
    a processor coupled to the transmitter and the receiver and is configured at least for:
       transmitting, via the transmitter, a first reference signal;
       transmitting, via the transmitter, a first configuration message comprising a first oversampling rate of a first dimension and a first oversampling rate of a second dimension;
       receiving, via the receiver, a first information feedback of the first reference signal based on the first oversampling rate of the first dimension and the first oversampling rate of the second dimension in response to transmitting the first configuration message; and
       transmitting, via the transmitter, a second configuration message comprising a second oversampling rate of the first dimension and a second oversampling rate of the second dimension after receiving the first information feedback.

* * * * *